United States Patent [19]
Arita et al.

[11] Patent Number: 5,701,394
[45] Date of Patent: Dec. 23, 1997

[54] INFORMATION PROCESSING APPARATUS HAVING A NEURAL NETWORK AND AN EXPERT SYSTEM

[75] Inventors: Setsuo Arita, Hitachiota; Tetsuo Ito, Hitachi; Yukiharu Ohga, Katsuta; Hiroshi Ujita, Tokyo; Fumio Murata, Katsuta; Masao Miyake, Hitachi; Yasuo Nishizawa, Hitachiota, all of Japan

[73] Assignee: Hitachi, Ltd., Tokyo, Japan

[21] Appl. No.: 425,334

[22] Filed: Apr. 18, 1995

Related U.S. Application Data

[63] Continuation of Ser. No. 628,329, Dec. 17, 1990, abandoned.

[30] Foreign Application Priority Data

Dec. 18, 1989 [JP] Japan .................................. 1-325985
Jul. 20, 1990 [JP] Japan .................................. 2-190548

[51] Int. Cl.[6] .......................... G05B 13/04; G06F 15/18
[52] U.S. Cl. ................ 395/11; 395/21; 395/22; 395/906; 395/907; 395/914
[58] Field of Search ........................ 395/11, 22, 906, 395/907, 914, 21

[56] References Cited

U.S. PATENT DOCUMENTS

| 4,853,175 | 8/1989 | Book, Sr. .......................... 395/11 |
| 4,884,217 | 11/1989 | Skeivik et al. .................... 395/11 |
| 4,965,741 | 10/1990 | Winchell et al. .................. 395/11 |
| 4,965,882 | 10/1990 | Barabash et al. ................. 395/11 |
| 4,999,833 | 3/1991 | Lee .................................. 395/11 |
| 5,295,197 | 3/1994 | Takenaga et al. ................. 395/21 |

FOREIGN PATENT DOCUMENTS 1224804  9/1989  Japan .

OTHER PUBLICATIONS

Rumelhart et al, "Parallel Distributed Processing", The MIT Press, vol. 1, 1988.
Yamada et al, "A Plant Diagnosis Method Based on the Knowledge of System Description", Journal of Inf. Processing, 1984.
Morooka et al, "Sensing Expert System and its Application to Diagnosis System", The Hitachi Review, vol. 71, Aug. 1989.
Nikkei Computer, 1.2, pp. 53–61, 1989.
Haykin et al, "Radar Vision", IEEE International Radar Conference, May 1990.
Yonezawa et al, "AI Process Monitor and Control Equipment", Sep. 7, 1989.
Wollenberg et al, "Feasibility Study for an Energy Management System Intelligent Alarm Process" 1986 IEEE.
"Design of Parallel Hardware Neural Network Systems from Custom Analog VLSI 'Building Block' Chips", Eberhardt et al, ISCNN, Jun. 1989.
"RUBIC: A Multiprocessor for Rule-Based Systems", Moldovan et al, Trans–on Systems, Man and Cibernetics vol. No. 4 Jul./Aug. 1989 IEEE.

*Primary Examiner*—George B. Davis
*Attorney, Agent, or Firm*—Antonelli, Terry, Stout & Kraus, LLP.

[57] ABSTRACT

Disclosed is an information processing system having a neural processing unit, an expert system for executing an inference using a rule, and an information selection unit. The neural processing unit and the expert system being arranged in parallel to each other. The information selection unit selects and outputs necessary information from the information outputted from the neural processing unit and the expert system. Since necessary information is selected and outputted from the information obtained from the neural processing unit and the expert system as a result of processing executed by the neural processing unit and the expert system in the parallelly different points of view, the certainty of the information to be selected is improved.

47 Claims, 24 Drawing Sheets

FIG. 10

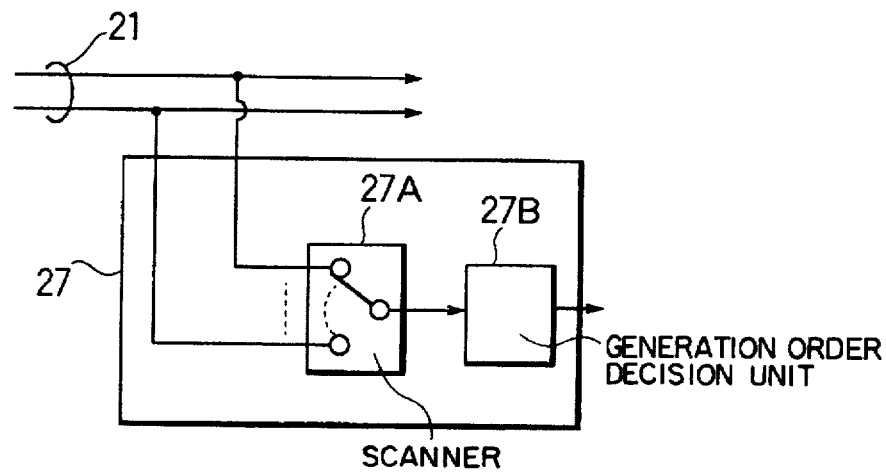

SCANNER

GENERATION ORDER DECISION UNIT

FIG. 11

| | (GENERATION TIME) | (ALARM SIGNAL) |
|---|---|---|
| SEQUENCE OF LAPSE OF TIME | XX(HR):XX(MIN):XX(SEC) | CONDENSER VACUUM LOW |
| | XX(HR):XX(MIN):XX(SEC) | TURBINE TRIP MULTIPLICATION DETECTOR OPERATE |
| | ------------------- | TURBINE TRIP OVERSPEED TRIP |
| | ------------------- | MAIN STEAM CHECK VALVE CHANNEL A CLOSE |
| | ------------------- | MAIN STEAM CHECK VALVE CHANNEL B CLOSE |
| | | MAIN STEAM CHECK VALVE CLOSE TRIP |
| | | A SYSTEM REACTOR AUTO SCRAM |
| | | B SYSTEM REACTOR AUTO SCRAM |

INFORMATION PROCESSING APPARATUS HAVING A NEURAL NETWORK AND AN EXPERT SYSTEM

This application is a continuation of Ser. No. 07/628,329, filed Dec. 17, 1990, now abandoned.

BACKGROUND OF THE INVENTION

The present invention relates to an information processing system, more particularly the present invention relates to an information processing system suitable for processing alarm information.

As one of information processing systems, an expert system (called a knowledge information processing apparatus) which is an information processing apparatus using knowledge technology has become to be used in various fields. The knowledge processing apparatus has a knowledge base and an inference unit (also called an inference mechanism). The knowledge base includes knowledge of a production type which is expressed by the rule of "if . . . , then . . . ", and/or knowledge of a frame type which is expressed by a frame structure, and so on. In either case, the knowledge processing apparatus outputs a suitable output result for input information given as a rule, but it does not output an answer if there are not any rules suitable to the information processing.

On the contrary, a neural network imitating a neural circuit makes a judgment, when it receives pattern-like information, analog information, or the like, which is difficult to be expressed as a rule, as to which one of learned data the input information is close, and outputs the result of judgment.

As one of combinations of a neural network and an expert system, FIG. 10 of The Hitachi Review, Vol. 71, No. 8, pp. 91 through 96, August of 1989, teaches an intellectual figure diagnosing system in which the output of a neuro-computer is fed into an expert system using fuzzy inference. In this system, the neuro-computer is used as a pre-processing unit of the expert system. Further in page 57 of "Neuro near realization in combination with ES", in Nikkei Computer, 1989, 1.2, pp. 53 through 61, there is a description as to use of a neural network for pre-processing of an expert system.

If an above-mentioned neural network is used for pre-processing of an expert system, the expert system executes inference by use of the output of the neural network.

SUMMARY OF THE INVENTION

It is therefore an object of the present invention to provide an information processing system in which the degree of certainty of information to be obtained can be improved.

The feature of the present invention is in that the information processing system comprises a neural processing unit, an expert system provided in parallel to the neural processing unit and for executing inference using a rule, and a unit for selecting information to be outputted from a group of information outputted from the neural processing unit and information outputted from the expert system.

By processing information in parallel by means of a neural processing unit and an expert system, it is possible to execute processing in different points of view. It is therefore possible to collect information throughly, and since information to be outputted is selected from the collected information, it is possible to improve the degree of certainty of the output information. That is, since it is possible to compensate the information obtained by a neural processing unit and a knowledge processing unit, it is possible to obtain information with a high degree of certainty.

BRIEF DESCRIPTION OF THE DRAWINGS

FIG. 10 is a configuration diagram illustrating in detail the alarm generation order decision unit of FIG. 1;

FIG. 11 is an explanatory diagram illustrating alarm signals arranged in time series by the alarm generation order decision unit;

DESCRIPTION OF THE PREFERRED EMBODIMENTS

An information processing system which is a preferred embodiment of the present invention will be described on the basis of an alarm information processing system to be applied to a boiling water reactor.

Figure 1:
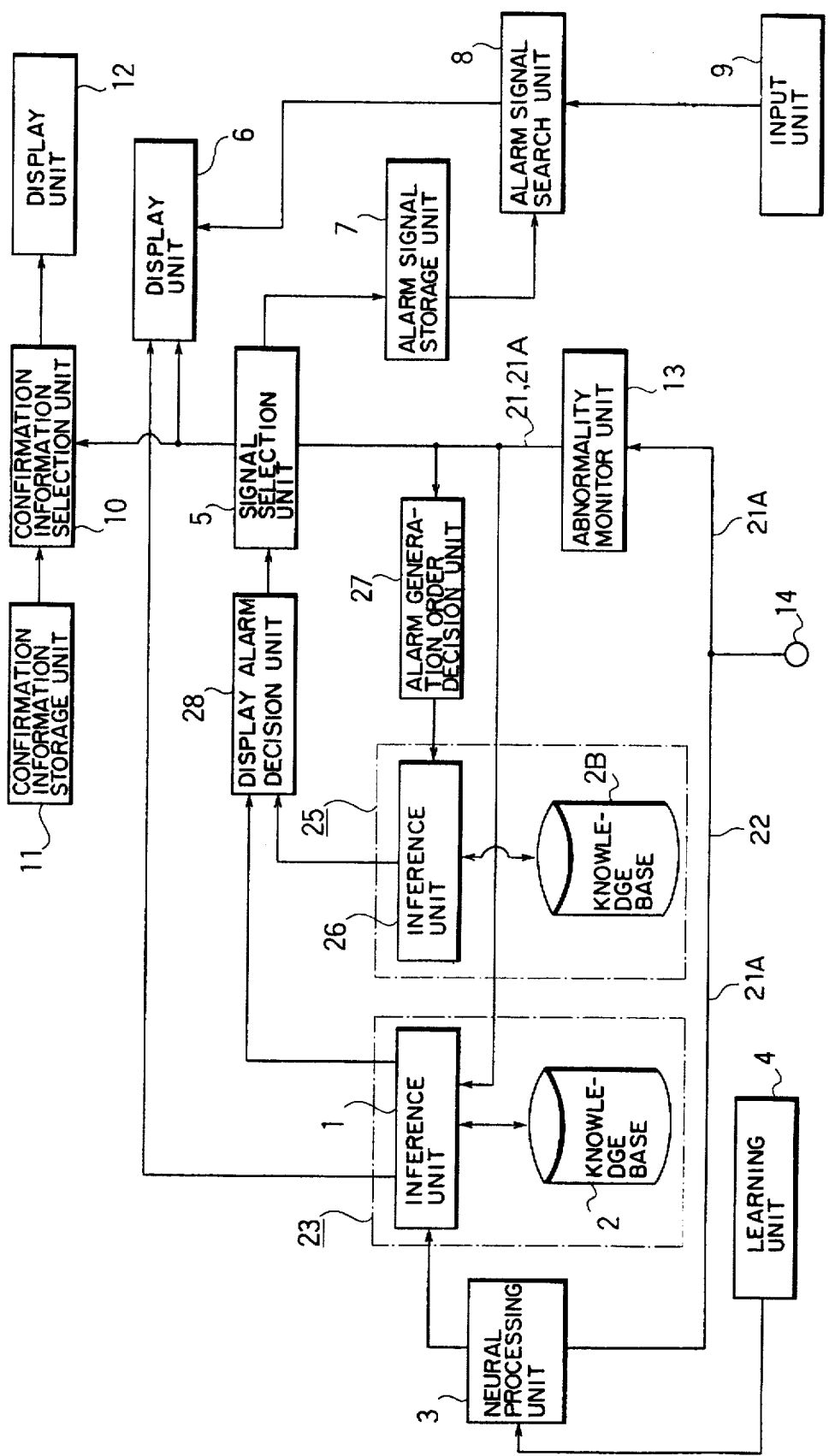
FIG. 1 is a configuration diagram illustrating an alarm information processing system which is a preferred embodiment of the present invention.

An alarm information processing system of this embodiment shown in FIG. 1 includes a neural processing unit 3, knowledge processing units 23 and 25, and a display alarm decision unit 28. In addition thereto, in this embodiment, provided are a learning unit 4, a signal selection unit 5, a display unit 6, an alarm signal storage unit 7, an alarm signal search unit 8, an input unit 9 which is a keyboard, a confirmation information selection unit 10, a confirmation information storage unit 11, a display unit 12, an abnormality monitor unit 13 and an alarm generation order decision unit 27. The knowledge processing unit 23 includes an inference unit 25 and a knowledge base 2. The knowledge processing unit 25 includes an inference unit 26 and a knowledge base 2B. The knowledge bases 2 and 2B serve to store rules as knowledge required for inference. The knowledge processing units 23 and 25 are expert systems. In addition, provided are a number of detectors 14 respectively for detecting state quantities (the reactor pressure, the reactor water level, the neutron flux, etc.) which are process quantities of a plant. The abnormality monitor unit 13 are provided in plural but do not have one-to-one correspondence to the detectors 14.

A state quantity detected by the detector 14 is supplied as a process signal 22 to the neural processing unit 3 and the abnormality monitor unit 13. The abnormality monitor unit 13 compares the value of the input process signal 22 with a corresponding process signal setting value, and an alarm signal 21 is output when the value of the input process signal 22 deviates from the region defined by the setting value. This alarm signal 21 is transmitted to the signal selecting unit 5 and the alarm generation order decision unit 27. In addition, means for detecting the operation of a limit switch, a relay, a changeover switch, and the like, to thereby generate on and off signals may be used as the detectors 14. In accordance with a subject on which a limit switch or the like is mounted, one of the on and off signals is used as an alarm signal 21A. Detection of the operation of a protective device is also performed by the detectors 14 for a relay and so on. The alarm signal 21A is supplied to the neural processing unit 3 and transferred as it is to the alarm generation order decision unit 27 and the signal selecting unit 5 through the abnormality monitor unit 13. The abnormality monitor unit 13 merely serves to make the input alarm signal 21A pass as it is. In the case where a third knowledge processing unit is provided specially for exclusive use for the alarm signal 21A separately from the knowledge processing unit 25, it is not necessary to provide the abnormality monitor unit 13 in the stage preceding the third knowledge processing unit.

Figure 2:
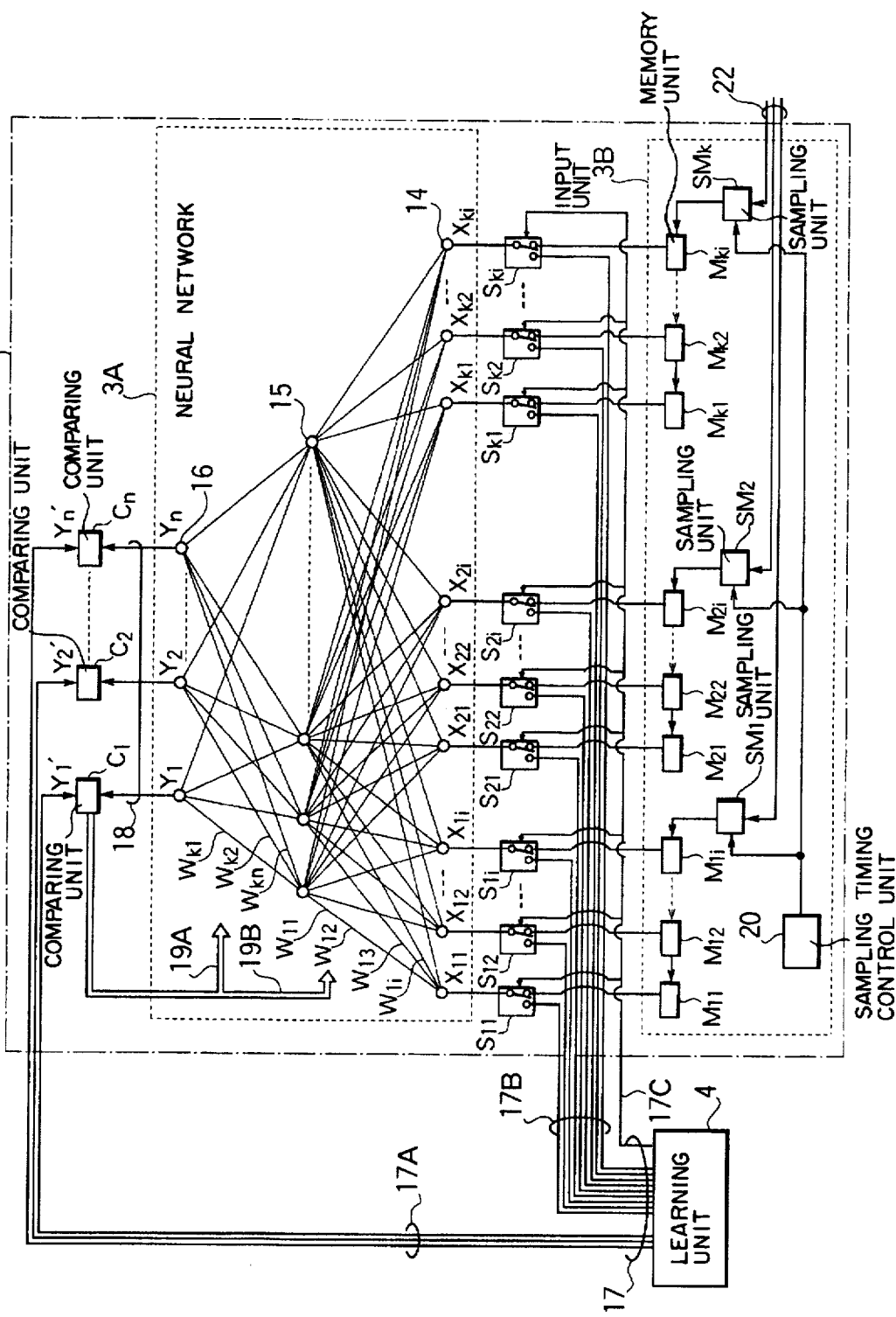
FIG. 2 is a configuration diagram illustrating in detail the neural processing unit of FIG. 1.

Referring to FIG. 2, the detailed configuration of the neural processing unit 3 will be described. The neural processing unit 3 includes a neural network 3A, an input unit 3B, comparing units $C_1$ through $C_n$, switching units $S_{11}$ through $S_{1i}$, $S_{21}$ through $S_{2i}$ and $S_k$ through $S_{ki}$. The neural network 3A includes a plurality of units 141 located in an input layer, a plurality of units 15 located in a hidden layer, and a plurality of units 16 located in an output layer. The respective units are connected into a network between the respective layers. The input unit 3B includes memory units $M_{11}$ through $M_{1i}$, $M_{21}$ through $M_{2i}$ and $M_{k1}$ through $M_{ki}$, sampling units $SM_1$ through $SM_k$, and a sampling timing control unit 20. The sampling units $SM_1$ through $SM_k$ serve to receive predetermined process signals 22 supplied from the corresponding detectors 14 respectively. Values $X_{11}$ through $X_{1i}$, $X_{21}$ through $X_{2i}$ ... and $X_{k1}$ through $X_{ki}$ are supplied to the neural network 3A. The values $X_{11}$ through $X_{1i}$ are data of reactor water level shown in FIG. 4, which have been sampled by the sampling unit $SM_1$. The values $X_{21}$ through $X_{2i}$ are data of neutron flux shown in FIG. 4, which have been sampled by the sampling unit $SM_2$. Although not shown, the values $X_{31}$ through $X_{3i}$ are data of drywell pressure in a housing vessel shown in FIG. 4, which have been sampled by the sampling unit $SM_3$ (not shown). The function of the memory units will be described taking the memory units $M_{11}$ through $M_{1i}$ as an example. The values of process signals sampled by the sampling unit $SM_1$ are transferred from the memory unit $M_{1i}$ to the memory unit $M_{11}$. Therefore the memory units $M_{11}$, $M_{12}$ ... $M_{1i}$ store the values $X_{11}$, $X_{12}$ ... $X_{1i}$ at the points of time $t_1$, $t_2$ ... $t_i$ respectively. At the point of time $t_{(i+1)}$, a value $X_{1(i+1)}$ is stored in the memory unit $M_{1i}$, so that the values $X_{12}$ through $X_{1i}$ which have been stored in the memory units $M_{12}$ through $M_{1i}$ are shifted so as to be stored in their left-hand memory units respectively. At this time, the value $X_{11}$ which has been stored in the memory unit $M_{11}$ disappears.

The switching units $S_{11}$ through $S_{1i}$, $S_{21}$ through $S_{2i}$ and $S_{k1}$ through $S_{ki}$ serve to connect the corresponding memory units with the corresponding units 141 in the input layer. If the switching units connect the units 141 with the memory units, the values stored in the memory units are supplied to the corresponding units 141. This is a data processing state in which the neural processing unit 3 performs normal processing on the basis of the process signals 22. The reference numerals $Y_1$, $Y_2$ ... , and $Y_n$ represent output signals of the respective units 16 in the output layer.

Figure 3:
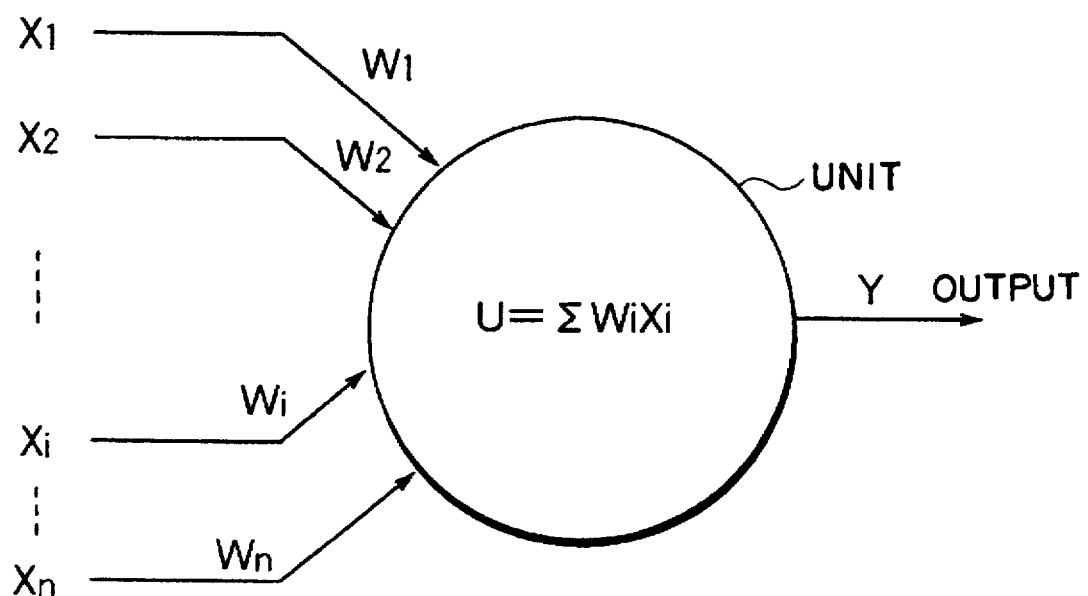
FIG. 3 is an explanatory diagram illustrating a model structure of a unit portion included in the neural network of FIG. 2.

The neural network 3A per se has been described in detail in "The MIT Press, Parallel Distributed Processing", 1988, No. 7, pp. 318 through 362. The basic idea thereof will be described hereunder. FIG. 3 shows a model of a unit of a neural network. Assume that input signals of the unit are $X_1$, $X_2$ ... $X_i$ ... and $X_n$, and weighting coefficients of connection between units (or layers) are $W_1$, $W_2$ ... $W_i$ ... and $W_n$ and take values within a range of $(-\infty, +\infty)$. Then, if an input $U_i$ transmitted from an $i^{th}$ input signal to the unit is expressed by the following expression (1), the total input U supplied to the unit can be expressed by the following expression (2).

$$U_i = W_i X_i \qquad (1)$$

$$U = \sum_{i=1}^{n} U_i \qquad (2)$$

The output Y of the input is defined by the following expression (3).

$$Y = \frac{1}{1 + e^{(U_o - U)}} \qquad (3)$$

Here, $U_o$ is a bias value.

In the neural network 3A, the above-mentioned unit models are arranged in layers, and output signals from respective units are used as input signals to respective units in the next layer.

The neural network 3A determines weighting coefficients ($W_{11}$, $W_{12}$ ... $W_{1i}$, $W_{k1}$, $W_{k2}$ ... $W_{kl}$ and so on) through learning. That is, when predetermined process information ($X_{11}$ through $X_{1i}$, $X_{k1}$ through $X_{ki}$) is given to the respective units in the input layer, the weighting coefficients between the respective units are corrected so that an output pattern signal 18 has a predetermined pattern, that is, a teaching signal 17A. An algorithm therefor is shown in the reference cited above, and is called a backpropagation method. The neural network 3A is made up by use of the backpropagation method.

The learning of the neural network 3A will be described in detail. A signal to order to learn is supplied to the learning unit 4 by a user. Then, the leaning unit 4 outputs a control signal 17C. The control signal 17C is supplied to the switching units $S_{11}$ through $S_{1i}$, $S_{21}$ through $S_{2i}$ and $S_{k1}$ through $S_{kj}$. At this time, the respective switching units disconnect the connections between the units 141 and the memory units and connect the units 141 with the learning unit 4 to thereby bring the neural network 3A into a learning state. The teaching signal 17A outputted from the learning unit 4 is supplied to comparison units $C_1$ through $C_n$, while the sample signal 17B also outputted from the learning unit 4 is supplied to the respective units-141 through the respective switching units. The units 15 in the hidden layer and the units 16 in the output layer output the output signals obtained by the expression (3) correspondingly to the sample signal. The comparison units $C_1$ through $C_n$ obtain the deviations between the respective signals $Y_1'$ through $Y_n'$ of the teaching signal 17A and the output signals $Y_1$ through $Y_n$ of the neural network 3A in accordance with the sample signal. The comparison units $C_1$ through $C_n$ further output a correction signal 19A for correcting the weighting coefficients $W_{k1}$, $W_{k2}$ ... $W_{kl}$ and so on and a correction signal 19B for correcting the weighting coefficients $W_{11}$, $W_{12}$ ... $W_{1j}$ and so on, so as to make the deviations smaller. These corrections of the weighting coefficients are executed until the above-mentioned deviations take predetermined values. Generally, these values are selected by a user.

Figure 4A:
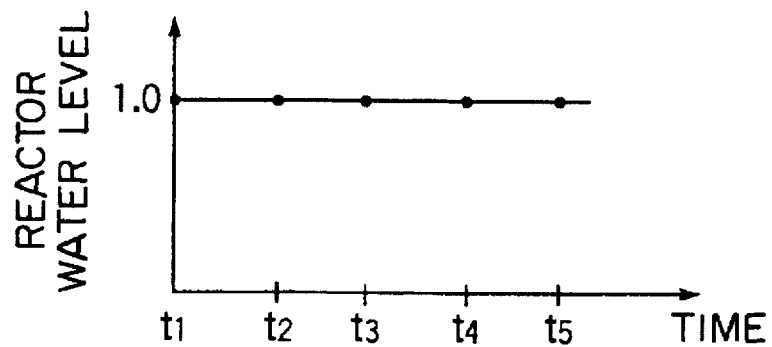
FIGS. 4A, 4B, 4C, 5A, 5B, 5C, 6A, 6B and 6C are explanatory diagrams illustrating sample signals for abnormal events in a plant, which are used for learning of the neural network.
Figure 4B:
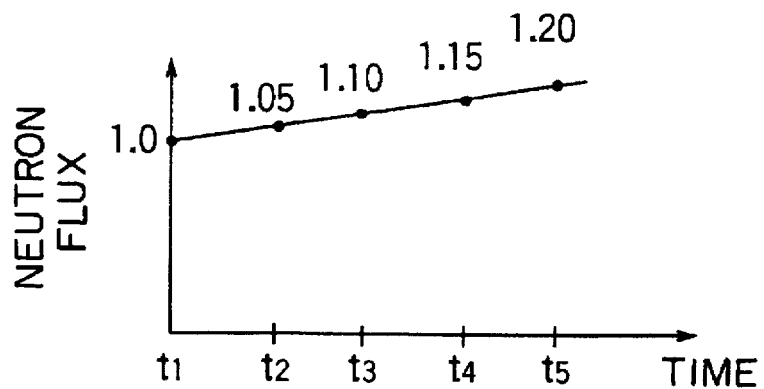
Figure 4C:
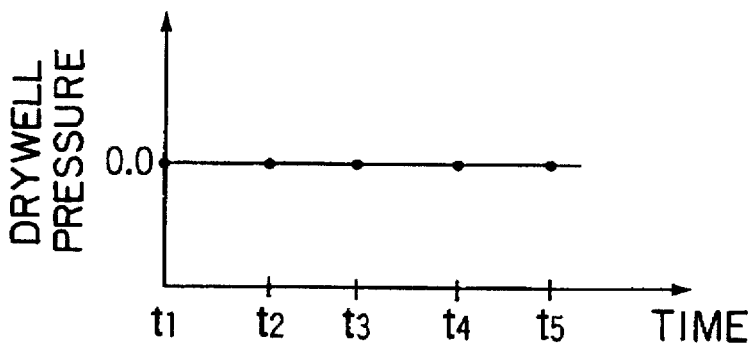
Figure 5A:
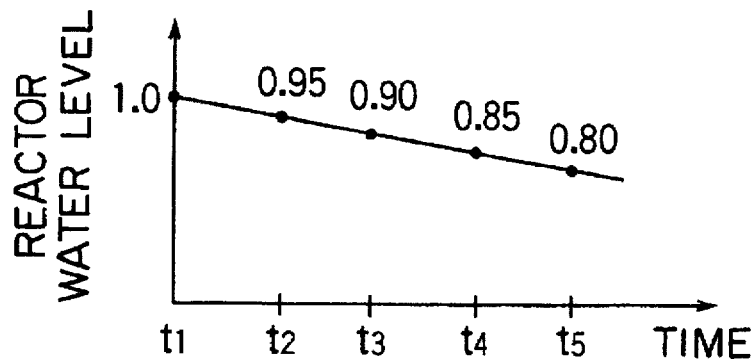
Figure 5B:
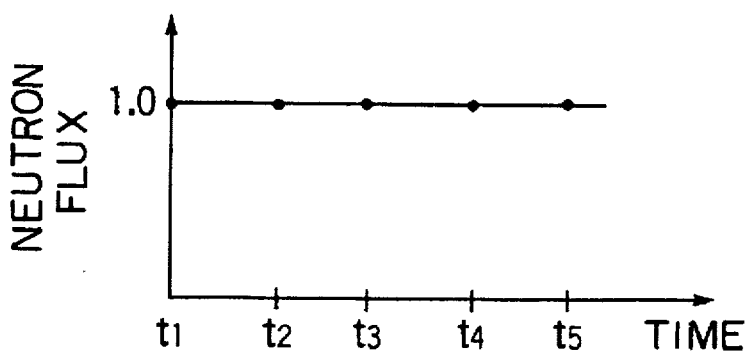
Figure 5C:
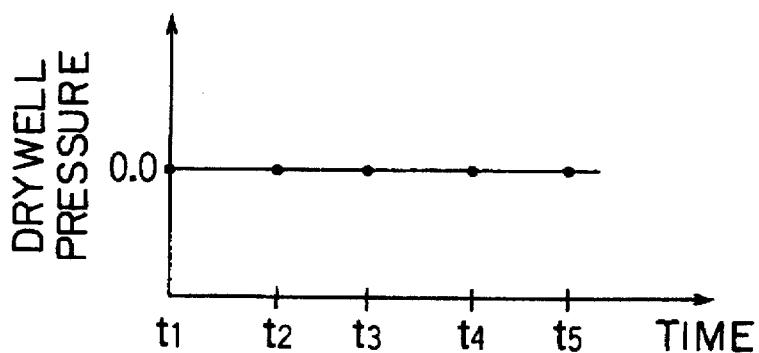
Figure 6A:
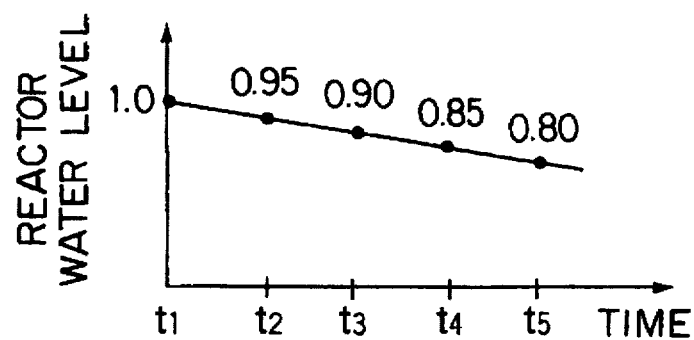
Figure 6B:
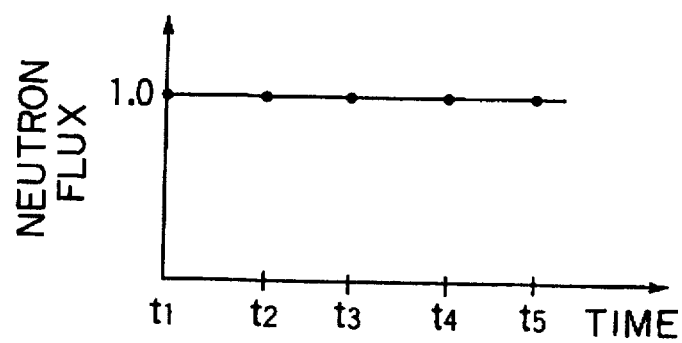
Figure 6C:
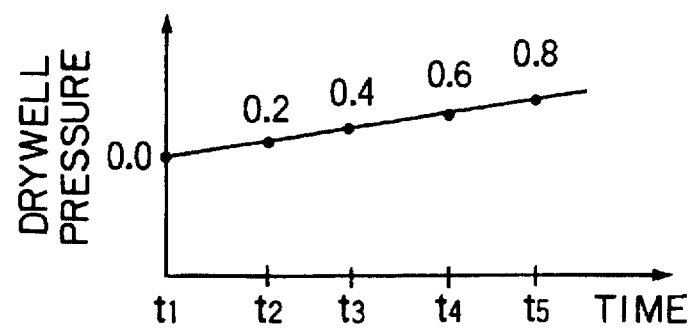

An example of the sample signal and the teaching signal used for learning will be shown in the following. FIGS. 4 through 6 show the relationships between abnormal events of a plant and sample signals. In this example, $X_{1i}$, $X_{2i}$ and $X_{3i}$, which are inputs to the neural network 3A, are data of reactor water level, neutron flux and drywell pressure respectively. Furthermore, i is 5 and k is 3. Respective process values of sample signals at the point of time $t_1$ are $X_{11}$, $X_{21}$ and $X_{31}$. At the point of time $t_2$, the process values are $X_{12}$, $X_{22}$ and $X_{32}$, ..., and at the point of time $t_5$, the process values $X_{15}$, $X_{25}$ and $X_{35}$. Further, the respective process values are expressed as relative values with reference to those at the rating time of the plant. For example, assume that a teaching signal 17A for a sample signal in loss of feedwater heating in FIGS. 4A to 4C takes $Y_1'=1$, $Y_2'=0$ and $Y_3'=0$. The example in FIGS. 4 through 6 has three abnormal events, so that n =3. Next assume that a teaching signal 17A for a sample signal in abnormality of a feedwater control system in FIGS. 5A to 5C takes $Y_1'=1$, $Y_2'=1$ and $Y_3'=0$. Assume that a teaching signal 17A for a sample signal in leakage of reactor coolant in FIGS. 6A to 6C takes $Y_1'=1$, $Y_2'=0$ and $Y_3'=1$. In a learning state, therefore, learning is achieved upon all the above-mentioned respective sample and teaching signals, and the weighting coefficients of the neural network are determined.

Figure 7:
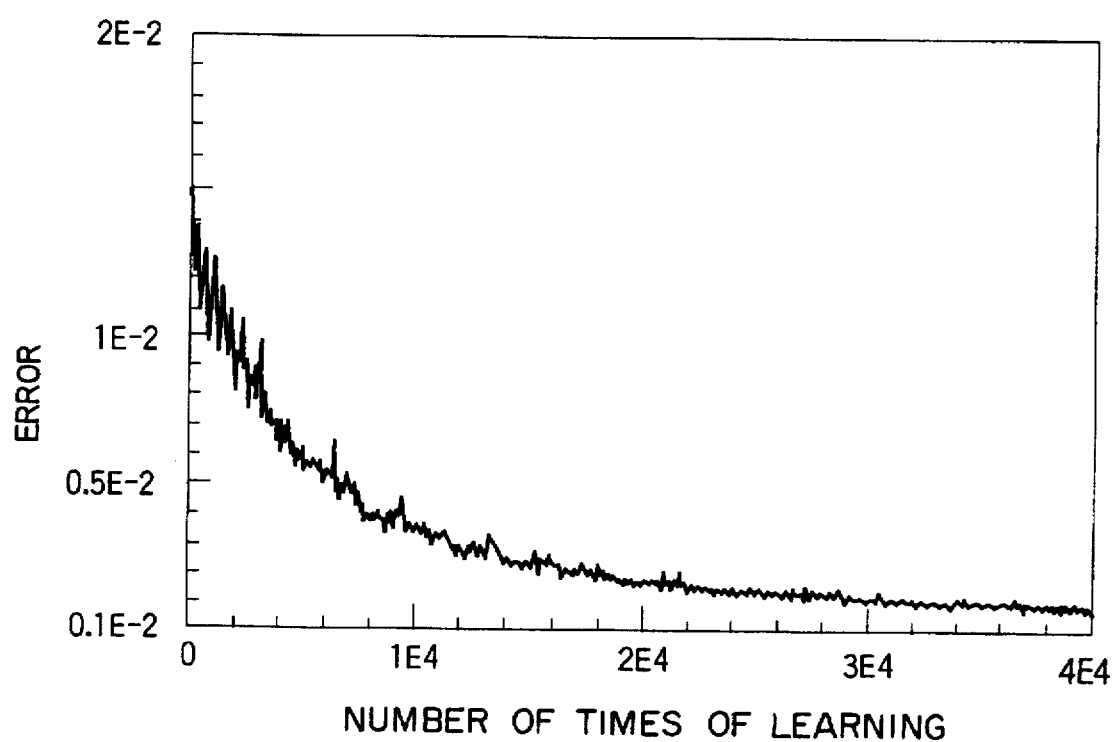
FIG. 7 is an explanatory diagram illustrating errors between sample signals and teaching signals in learning correspondingly to the number of times of learning.

A learning result judgment unit (not shown) provided in the neural processing unit 3 computes the degree of learning of the neural processing unit 3 on the basis of inputs of the deviation obtained by the comparison units $C_1$ through $C_n$. This degree of learning is displayed in a display unit (not shown) provided near the learning unit 4. FIG. 7 is a display example thereof. FIG. 7 shows the deviations between sample signals and teaching signals at this leaning time, that is, errors in the relationship to the number of times of learning. By displaying the degree of learning, it is possible for a user to easily confirm the convergent state of learning. It is judged here that learning has converged if errors are not more than 0.1. In this state, it can be said the neural network 3A has learned enough. That is, the neural network has learned many times of learning. If learning diverges, sample signals and teaching signals are established again. Thus, the neural network 3A can be made up efficiently.

Measuring the values of output signals $Y_1$ through $Y_3$ by using the neural network 3A which had learned when the same sample signals as those in FIGS. 4 through 6 were given from the learning unit 9, the following result was obtained. In the loss of feedwater heating in FIGS. 4A to 4C, $Y_1=0.94$, $Y_2=0.06$ and $Y_3=0.01$ were measured. As a matter of course, this was indeed almost the same result as the teaching signal 17A. In the abnormality of a feedwater control system in FIG. 5, $Y_1=0.06$, $Y_2=0.94$ and $Y_3=0.03$ were measured, and in the leakage of reactor coolant in FIG. 6, $Y_1=0.02$, $Y_2=0.02$ and $Y_3=0.98$ were measured.

Next, in FIGS. 4A to 4C, making the values $X_{21}=1.0$, $X_{22}=1.1$, $X_{23}=1.2$ and $X_{25}=1.4$ when the neutron flux in the diagram FIG. 4B was increasing at a two-fold change rate, and making the reactor water level and the drywell pressure as they are in FIGS. 4A and 4C, then the output of the neural network 3A took $Y_1=0.91$, $Y_2=0.09$ and $Y_3=0.09$. This is almost the same value as the teaching signal 17A. The output of the neural network 3A is not so influenced by the change rate of increase and decrease of input signals, and is determined on a pattern of increase and decrease of the input signals.

In FIGS. 6A to 6C, supposing the case where the change start time of the reactor water level and the drywell pressure is late, making $X_{11}=1.0$, $X_{12}=1.0$, $X_{13}=0.95$, $X_{14}=0.9$, $X_{15}=0.85$, $X_{31}=0.0$, $X_{32}=0.0$, $X_{33}=0.2$, $X_{34}=0.4$, and $X_{35}=0.6$, and making the neutron flux be left as it is in the diagram FIG. 6B, then the output of the neural network took $Y_1=0.08$, $Y_2=0.06$ and $Y_3=0.84$. This is also almost the same value as the teaching signal 17A. As this result, it is understood that the output of the neural network 3A is not so influenced by the time lag between input signals, and is determined on a pattern of increase and decrease of the input signals.

As mentioned above, the neural network 3A can judge abnormal events of a plant according to the pattern of input signals. If the state of the plant is judged on the basis of the information of the process signals 22 by use of knowledge technology, it is necessary to make up a rule as the knowledge indicating the relationship between the values of the respective process signals and their corresponding events of the plant. As has been described, in order to regard cases different only in their size of change of a signal as the same events, it is necessary to prepare their corresponding knowledge separately. With respect to making up the knowledge, the quantity of knowledge to be stored in a knowledge base becomes extremely large. It therefore takes very much time to make up knowledge. In addition, there is a possibility of forgetting to make up a part of knowledge because the quantity of the necessary knowledge is very large. On the contrary, by using the neural network 3A, it is little influenced by the more or less change quantity of process signals and the time lag between the process signals, and it is possible to obtain abnormal events of a plant accurately even on the basis of such an uncertain information. It is also possible to obtain abnormal events of a plant accurately in the case using noises including the above-mentioned change quantity. This embodiment has a configuration in which the learning unit 4 is provided for making the neural processing unit 3 learn, so that the neural processing unit 3 can also easily learn a newly generated abnormal event. Therefore this embodiment can easily cope with processing upon new abnormal events. The quantity of knowledge to be newly made up for a new abnormal event is much smaller than that in the case without the neural processing unit 3.

Upon completion of learning, the switching units $S_{11}$ through $S_{1j}$, $S_{21}$ through $S_{2j}$ and $S_{k1}$ through $S_{kj}$ are switched from the connection for a learning state to the connection for a normal data processing state.

The values of the process signals 22 gathered by the sampling unit as mentioned above are transferred to their corresponding memory units sequentially, so that the respective units 141 in the input layer of the neural network 3A receive the values of the respective process signals at the same time. Therefore, even if there occurs more or less time lag between the values of the process signals due to the operation delay of plant equipments, the lag will not become larger than it is, so that the neural network 3A can judge abnormal events correctly even on the basis of such an uncertain information. In addition, since the neural network 3A obtains its output by use of values obtained by multiply the values of input signals by weighting coefficients, its processing speed is very high upon uncertain information. Particularly in this embodiment, the pattern of a plurality of process signals which are live data of a plant is judged by the neural processing unit 3 for obtaining an abnormal event, so that the obtained abnormal event is very high in its accuracy.

The output $Y_1, Y_2, \ldots, Y_n$ of the neural processing unit 3 obtained in a normal data processing state are supplied to the inference unit 1 through the respective units 16 in the output layer.

The knowledge processing unit 23 used in this embodiment includes the inference unit 1 and the knowledge base 2. The knowledge base 2 stores at least three kinds of knowledge. The first knowledge is a rule of a production type, relating to the pattern of the output of the neural processing unit 3 to abnormal events of a plant. For example, in the abnormal event as shown in FIGS. 4A to 4C, this knowledge is expressed by:

"if($0.9 < Y_1 < 1.1$, $-0.1 < Y_2 < 0.1$, and, $-0.1 < Y_3 < 0.1$), then (loss of feedwater heating)"

The second knowledge is knowledge based upon the structure disclosed in the clause 3.1 of p. 144 in "Journal of information Processing", Vol. 7, No. 3, 1984, pp. 143 through 148"(hereinafter referred to as 'knowledge of structure'). For example, the knowledge of structure for a boiling water reactor includes the knowledge of the connecting relationship of equipments and parts belonging to the plant. For example, this knowledge can expressed by:

(conn(output 1C)(input 2A))

Figure 8:
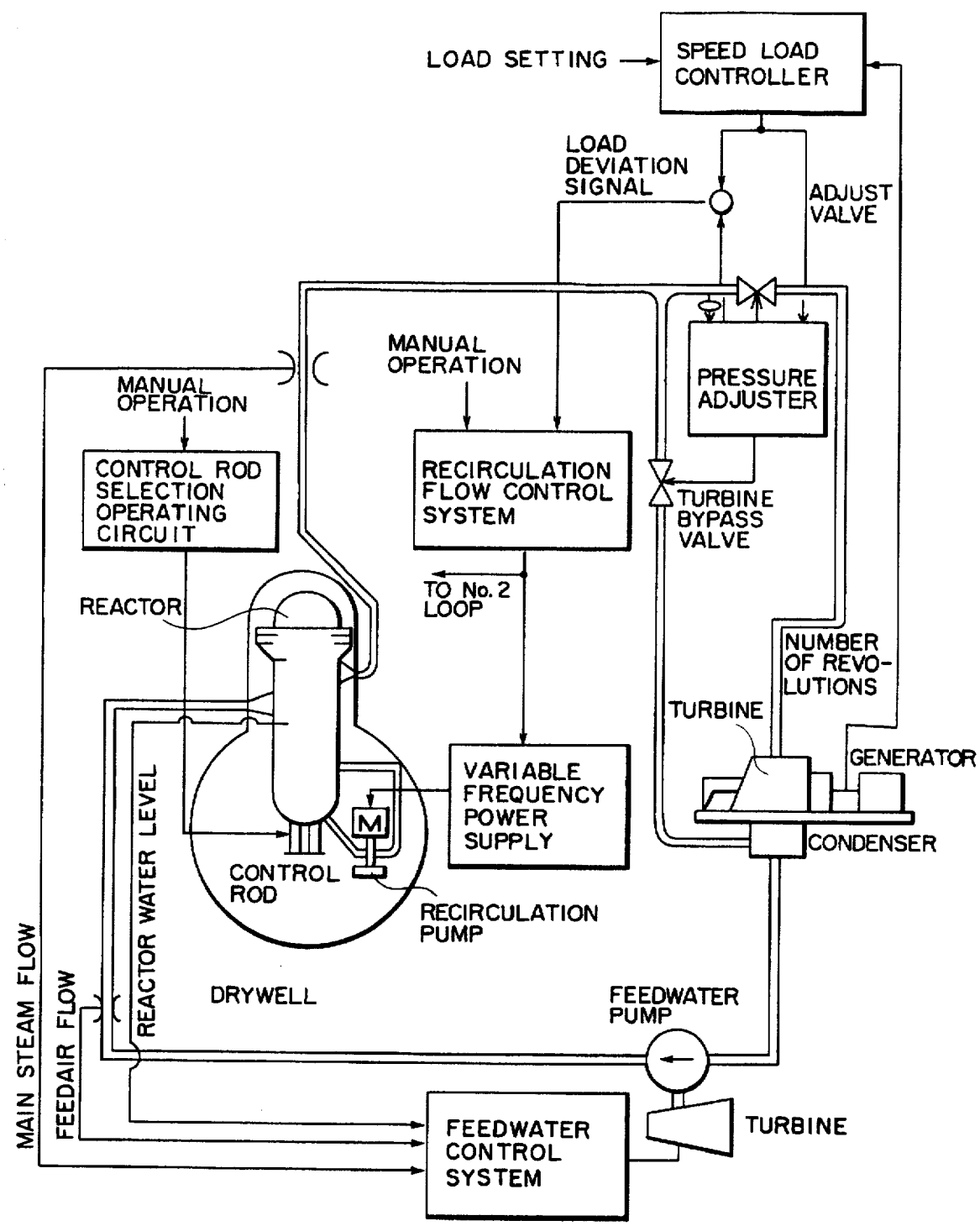
FIG. 8 is a configuration diagram illustrating a boiling water reactor expressed by the knowledge of structures.

This knowledge is a kind of rule, let 1C a "feedwater pipe arrangement" and 2A a "reactor pressure vessel", and the knowledge unit "the output terminal of the feedwater pipe arrangement is connected with the input terminal of the reactor pressure vessel". Other examples of the knowledge of structure are such that "the output terminal of the reactor pressure vessel is connected with the input terminal of the main steam pipe arrangement", the output terminal of the feedwater pump is connected with the input terminal of the feedwater pipe arrangement", and so on. The structure of a boiling water reactor shown in FIG. 8 is expressed by such a knowledge.

The third knowledge is knowledge based upon the behavior of a plant including the operation of the control and manipulation of the plant (hereinafter referred to as 'knowledge of behavior'). This knowledge has been disclosed in the clause 3.2 from the right volume of p. 144 to the left volume of p. 145 in the above-mentioned "Journal of Information Processing", Vol. 7, No. 3. The following TABLE shows the knowledge of operations stored in the knowledge base of FIG. 1, that is, shows examples of the third knowledge used in this embodiment.

TABLE

| No. | Third Knowledge |
|---|---|
| No. 1 | If (reactor scram), then (plant trip) |
| No. 2 | If (main stream separation value trip), then (plant trip) |
| No. 3 | If (turbin trip), then (plant trip) |
| No. 4 | If (generator trip), then (plant trip) |
| No. 5 | If (reactor water level low), then (reactor scram) |
| No. 6 | If (feedwater faculty decrease), then (reactor water level low) |
| No. 7 | If (loss of coolant), then (reactor water level low) |
| No. 8 | If (feedwater pump abnormal), then (feedwater faculty decrease) |
| No. 9 | If (feedwater pipe leakage), then (feedwater faculty decrease) |
| No. 10 | If (feedwater control system abnormal, then (feedwater faculty decrease) |
| No. 11 | If (neutron flux level high), then (reactor scram) |
| No. 12 | If (loss of feedwater heating), then (feedwater faculty decrease) |
| No. 13 | If (cold shutdown), then (pressure decrease control) |
| No. 14 | If (cold shutdown), then (residual heat discharge system control) |
| No. 15 | If (cold shutdown), then (output control) |
| No. 16 | If (cold shutdown), then (reactor water level control) |

The third knowledge is also a rule of a production type.

Figure 9:
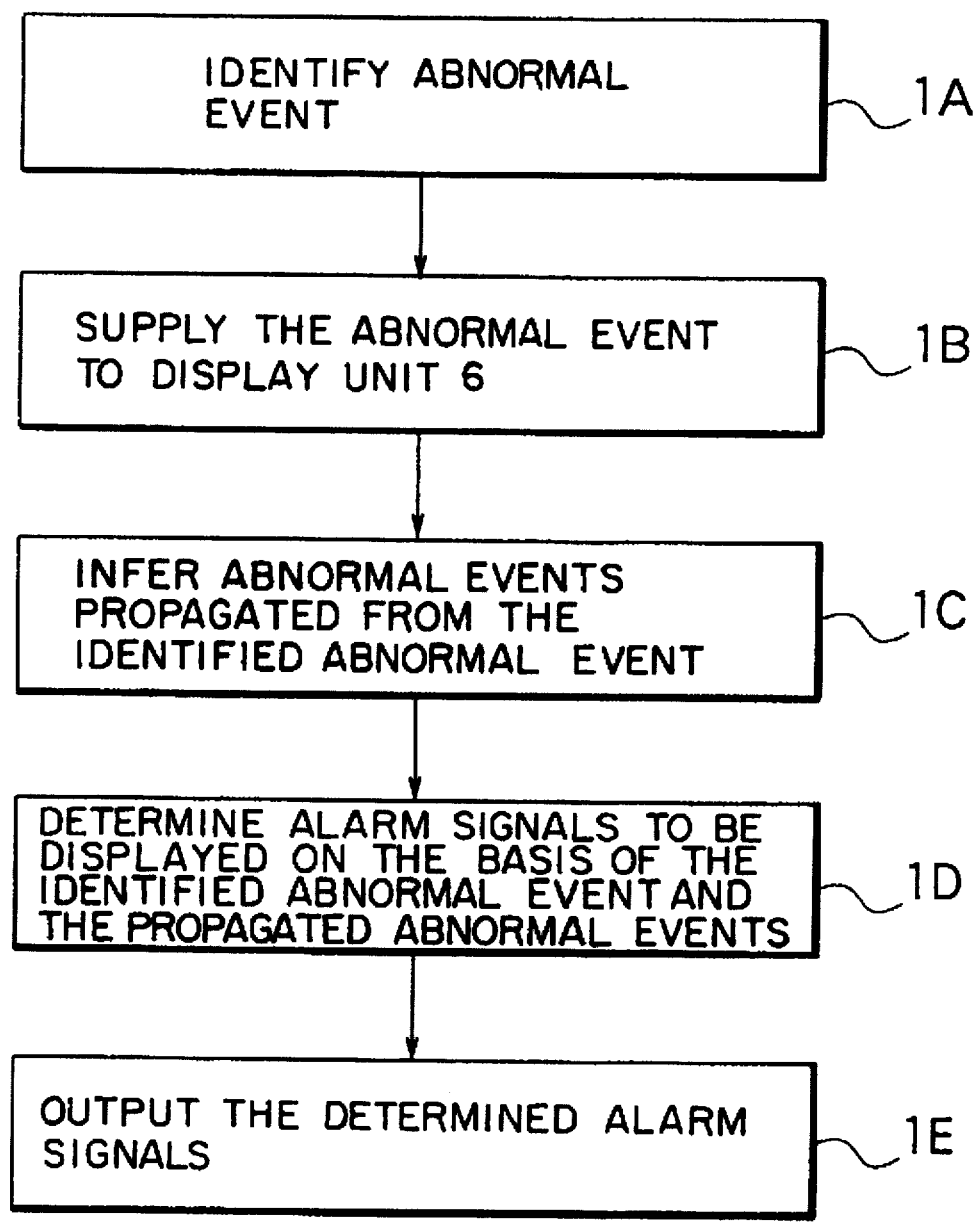
FIG. 9 is an explanatory diagram illustrating a procedure of processing executed by the inference unit 1 of FIG. 1.

The inference unit 1 executes processing shown in FIG. 9. In the step 1A, the inference unit searches the first knowledge having a condition part (if part) matching the pattern of the received output $Y_1, Y_2, \ldots, Y_n$ of the neural processing unit 3, and obtains the conclusion part (then part) of the searched first knowledge as the result. The contents of this conclusion part is an abnormal event corresponding to the output of the neural processing unit 3. Thus, the abnormal event obtained by the neural processing unit 3 is identified. The obtained abnormal event is supplied to the display unit 6 (the step 1B). The abnormal event is displayed on the display unit 6.

Next the processing in the step 1C is executed. That is, inference is performed by using the abnormal event identified in the step 1A (hereinafter referred to as 'identified abnormal event') and the third knowledge to thereby infer abnormal events propagated from the identified abnormal event (hereinafter referred to as 'propagated abnormal events'). It can be said this processing in the step 1C is a forecasting processing of propagated abnormal events on the basis of an identified abnormal event, that is, the output of the neural processing unit 3. The processing in the step 1C will be described more specifically. Let the output of the neural processing unit be 3 $Y_1=0.94$, $Y_2=0.06$ and $Y_3=0.01$. Then the inference unit 1 searches the third knowledge having the abnormal event identified in the step 1A, that is, "loss of feedwater heating" in its conclusion part, and further searches the third knowledge having the conclusion part of the searched third knowledge in its condition part. Repeating such a search, obtained are corresponding propagated abnormal events. As propagated abnormal events corresponding to "loss of feedwater heating", obtained are "high neutron flux level", "reactor scram" and "plant trip".

In the step 1D, important alarm signals to be displayed (hereinafter referred to as 'display alarm signal') are determined on the basis of the identified abnormal event and the propagated abnormal events. The second and fourth knowledge stored in the knowledge base 2 are used to determined these display alarm signals. The fourth knowledge is a rule for determining display alarm signals in a boiling water reactor. As the display alarm signals, this fourth knowledge rules an alarm signal (first display alarm signal) relating to an identified abnormal event, an alarm signal (second display alarm signal) indicating a main factor causing a plant trip first, and a predetermined important alarm signal (third display alarm signal) of alarm signals produced by the plant trip. The first display alarm signal is an alarm signal for equipments relating to an identified abnormal event. The first display alarm signal is determined on the basis of the second knowledge. "Loss of feedwater heating" which is an identified abnormal event means the loss of the function of a feedwater heater provided in a feedwater pipe arrangement. Systems and equipments connected with the feedwater heater are obtained through inference using the second knowledge. A steam jet air ejection system, a drain system, and parts constituting these systems correspond thereto. An abnormal portion of the plant is obtained on the basis of an alarm signal which is of the alarm signals 21 and 21A supplied to the inference unit 1 and is concerned with these systems and parts. This alarm signal concerned with an abnormal portion is the first display alarm signal. The second display alarm signal is obtained on the basis of the propagated abnormal events obtained in the step 1C. That is, a factor as a direct cause of "reactor scram", "main steam separation valve trip", "turbine trip" or "generator trip-"which is a factor in a plant trip is the second display alarm signal. The second display alarm signal for "loss of feedwater heating" is "high neutron flux level". The third display alarm signal is a remainder of the above-mentioned four factors of a plant trip except for ones produced by the propagation of the identified abnormal event. "Main steam separation valve trip", "turbine trip" and "generator trip" are the third display alarm signals for "loss of feedwater heating".

The respective display alarm signals obtained in the step 1D are supplied to the display alarm decision unit 28 (the step 1E). Then the processing in the inference unit 1 is completed.

Disposing the knowledge processing unit 23 in a stage following the neural processing unit 3, produced is a new effect. That is, the neural processing unit 3 can process information even if the information is uncertain, particularly analog or pattern-like, and the neural processing unit 3 can process input information even if the information is slightly different from that supplied in a learning state. By converting uncertain information into not-uncertain information by use of the neural processing unit 3, the knowledge processing unit 23 can execute deeper inference on the basis of the not-uncertain information. Therefore, since detailed information processing can be performed in the knowledge processing unit 23, it is possible to obtain a more suitable solution (suitable display alarm signals in this embodiment) for a problem to be solved. In addition, it is possible to reduce the quantity of knowledge such as rule stored in a knowledge base in comparison with the case in which the neural processing unit 3 is not provided. It is also possible to shorten time required for inference performed in the inference unit 1 so much as the quantity of knowledge is reduced. By extracting a plant abnormal event through the information processing of the neural processing unit 3, it is possible to forecast propagated abnormal events in the knowledge processing unit 23. It is therefore possible to shorten inference time to obtain alarm signals to be displayed. When an abnormal event is produced, an alarm signal based on a direct cause thereof is not always generated earliest. This is because respective alarm signals are independent of each other, the degrees of change of process signals originating the alarm signals are different, and threshold values for generating the alarm signals are different. In this embodiment, however, without relating to the order of generated alarm signals, it is possible to obtain display alarm signals suitably. This is originated by obtaining a plant abnormal event in the neural processing unit 3. Since abnormal portions are extracted by use of the knowledge of structure and the knowledge of behavior, it is possible to shorten time required for extracting the abnormal portions. Further, it is possible to narrow the abnormal portions to a desired portion, thereby improving the accuracy of decision of display alarm signals.

The alarm generation order decision unit 27 includes a scanner 27A and a generation order decision unit 27B as shown in FIG. 10. The scanner 27A sequentially receives the alarm signals 21 and 21A supplied from the plurality of abnormality monitor units 13 and the detectors 14. The generation order decision unit 27B have a timer function to add the information of generation time to the alarm signals 21 and 21A supplied from the scanner 27A. Further, the generation order decision unit 27B arranges the alarm signals 21 and 21A including their generation time in time series in the order of the generation time. In the case where the information indicating the time of generation of the alarm signals 21 and 21A is added thereto in the abnormality monitor unit 13, the generation order decision unit 27B is only to align the alarm signals 21 and 21A in time series without adding the generation time. FIG. 11 shows an example of arrangement of the alarm signals 21 and 21A in time series. Main steam stop valve trip is an alarm signal 21A obtained by a limit switch which has detected that a main steam stop valve is closed by 10%. The respective alarm signals 21 and 21A from the alarm generation order decision unit 27 are supplied to the inference unit 26 of the knowledge processing unit 25.

Figure 12:
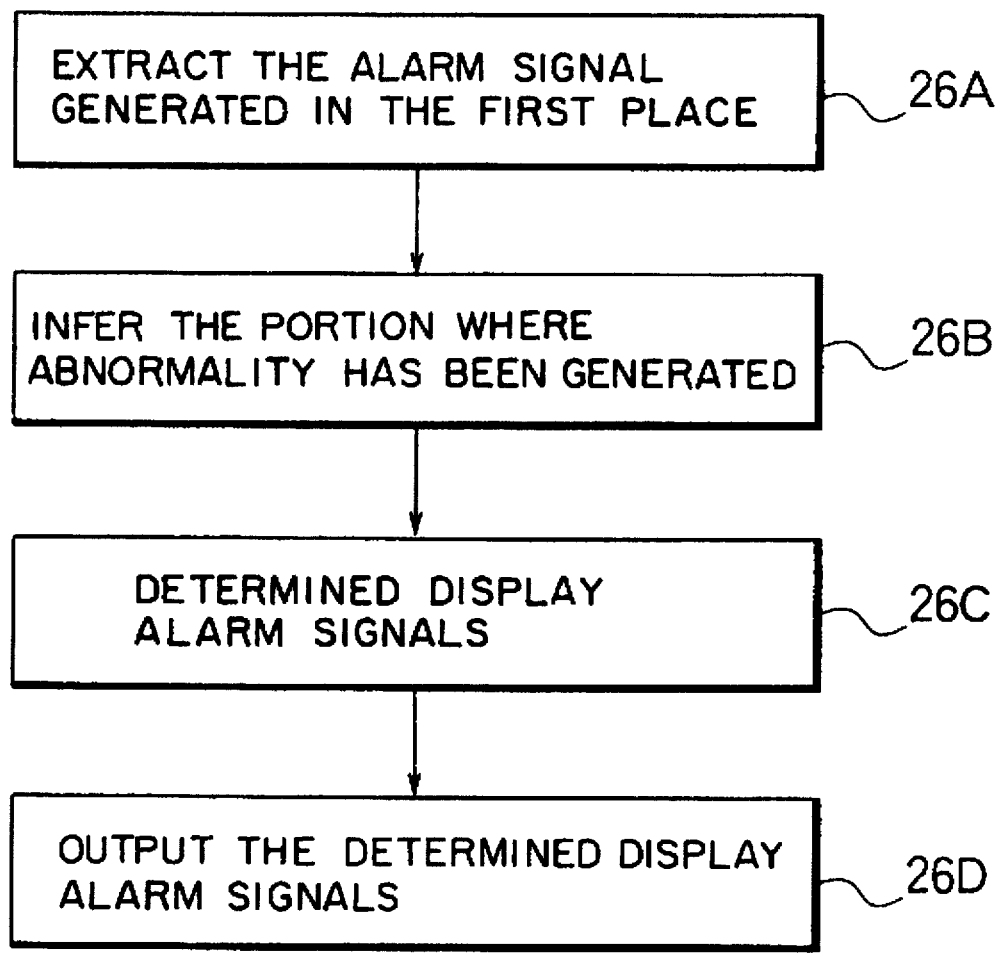
FIG. 12 is an explanatory diagram illustrating a processing procedure executed by the inference unit 26 of FIG. 1.

The inference unit 26 executes processing shown in FIG. 12. The knowledge base 2B stores the sixth knowledge as well as the above-mentioned second and third knowledges. The sixth knowledge is a rule for determining display alarm signals on the basis of the information of the alarm signals 21 and 21A. As display alarm signals, the sixth knowledge rules the above-mentioned second and third display alarm signals, an alarm signal produced for the first time (hereinafter referred to as 'first alarm signal'), and an alarm signal inducing the first alarm signal (hereinafter referred to as 'fourth display alarm signal'). The fourth display alarm signal is an alarm signal inducing the first alarm signal and concerned with an abnormal portion. This third display alarm signal corresponds to the above-mentioned first display alarm signal. A first display alarm signal corresponds to an abnormal event output from the inference unit 1 to the display unit 6 in the step 1B of FIG. 9.

The inference unit 26 extracts the first alarm signal having the oldest generation time of the alarm signals 21 and 21A supplied from the alarm generation order decision unit 27 in the step 26A. In the step 26B, inference is performed by use of the second and third knowledges on the basis of this first alarm signal so as to infer an abnormal portion of a plant. The processing in the step 26B will be described in specimen, taking the case the first alarm signal extracted in the step 26A is "low reactor water level" for example. First, the third knowledge having the first alarm signal in its conclusion part is searched, and the condition part of the obtained third knowledge is extracted. Nos. 6 and 7

(TABLE) in the third knowledge correspond to "low reactor water level", and their condition parts "decrease of feedwater faculty" and "loss of coolant" are extracted. Next, if a plurality of condition parts are extracted, a condition part ruling a suitable abnormal event is selected on the basis of alarm signals supplied from the alarm generation order decision unit 27. Assume that the alarm signals include not an alarm signal indicating the loss of coolant but an alarm signal indicating the decrease of feedwater faculty (for example, low quantity of feedwater flow). Then, "decrease of feedwater faculty" is selected. Equipments, pipe arrangements or systems relating to the selected condition part are specified by the inference using the second knowledge. That is, since "decrease of feedwater faculty" relates to feedwater, structures such as a pipe arrangement, a feedwater pump, a feedwater control system, etc. are specified. Alarm signals relating to the specified structures are extracted. If there is only an extracted alarm signal, a part relating to the alarm signal is an abnormal portion. If there are a plurality of extracted alarm signals, performed is a forward inference which uses the third knowledge taking the extracted alarm signals as start points. When knowledge having the above-mentioned selected condition part (decrease of feedwater faculty) in its conclusion part is selected in the process of this inference, a portion relating to an alarm signal which is being taken as a start point is an abnormal portion. If the alarm signal for the structure relating to water feeding is only "abnormality of feedwater pump", the abnormal portion is a feedwater pump.

In the step 26C, display alarm signals are determined on the basis of the sixth knowledge. In the above-mentioned example, the first alarm signal is "low reactor water level", the second display alarm signal is "low reactor water level", the third display alarm signals are "main steam separation valve trip", "turbine trip" and "generator trip", and the fourth display alarm signal is "abnormality of feedwater pump". The second and third display alarm signals are obtained in the same manner as in the step 1D of FIG. 9. The determined display alarm signals are supplied to the display alarm decision unit 28 (the step 26D). The knowledge processing unit 28 can obtain a new display alarm signal (such as the fourth display alarm signal) which is not included in the display alarm signals obtained by the knowledge processing unit 23.

The display alarm decision unit 28 receives the display alarm signals determined by the knowledge processing units 23 and 25 and determines final display alarm signals on the basis of those input signals. That is, with respect to the display alarm signals suppliedfrom the knowledge processing units 23 and 25, the display alarm decision unit 28 selects those obtained by ORing the above input display alarm signals as those to be outputted. The number of the display alarm signals determined by the display alarm decision unit 28 is more than the number of those obtained by each of the knowledge processing units 23 and 25. The display alarm signals are supplied to the signal selection unit 5. The signal selection unit 5 selects the alarm signals 21 and 21A corresponding to the input display alarm signals and supplies them to the display unit 6. The other not-corresponding alarm signals are prevented from being displayed on the display unit 6. The selected alarm signals 21 and 21A are displayed on the display unit 6. Since the identified abnormal event and the above-mentioned display alarm signals are displayed on the display unit 6, a user (operator) can easily understand an abnormal event generated in a plant and alarm signals important on the running and monitor of the plant. Further, the user can grasp the cause of the abnormal event from the display contents properly and execute the operation corresponding thereto and thereafter properly and immediately.

The alarm signals prevented by the signal selection unit 5 from being displayed are stored by the alarm signal storage unit 7. The alarm signals prevented from being displayed are by-product alarm signals. Taking "loss of feedwater heating" as an example, there are high water level of a scram discharge valve produced after producing a scram, low reactor water level, lower limitation of an LPRM, and so on. A user inputs an abnormal event corresponding to desired alarm signals through the input unit 9. The signal search unit 8 searches the alarm signal storage unit 7 for the alarm signals which have been prevented from being displayed and relate to the abnormal event corresponding to the output of the input unit 9. The searched alarm signals are displayed on the display unit 6. With the alarm signal storage unit 7 and the signal search unit 8, it is possible to confirm all alarm signals at the point of time when the plant comes into a stable state after completion of coping with the abnormal event. Therefore, if it is necessary to perform processing for those alarm signals, it is easy to cope therewith.

The confirmation information storage unit 11 stores information required for confirmation of abnormal events, disposal operation information and drawing information such as a system configuration diagram. The confirmation information selection unit 10 receives alarm signals selected by the signal selection unit 5 and searches the confirmation information selection unit 10 for information relating to the signals. The searched information is displayed on the display unit 12. By this, a user can easily know the information to confirm and the disposal operation information for coping with the abnormal event in question. This causes a reduction of the burden of the user performing disposal operations thereafter.

It can be said that this embodiment has a first information processing unit including the neural processing unit 3 and the knowledge processing unit 23, and a second information processing unit disposed in parallel thereto and including the abnormality monitor unit 13 and the knowledge processing unit 25 and not including a neural processing unit. The first information processing unit is means for extracting first information expressed by a plurality of pieces of information inputted at the same time, and for obtaining new second information as a solution of a given problem by inference by use of this first information and knowledge therefor. The first information and the second information are obtained by the neural processing unit 3 and the knowledge processing unit 23 respectively. The second information processing unit is means which receives the input information supplied to the first information processing unit, produces third information indicating a singular state of corresponding input information for every input information, and obtains new fourth information as a solution of the above-mentioned given problem by inference by use of this third information and knowledge therefor. The third information indicating a singular state of input information unit, for example, an alarm signal indicating passing a threshold value in this embodiment. The third information and the fourth information are obtained by the abnormality monitor unit 13 and the knowledge processing unit 25 respectively. This embodiment can process input information from different points of view so as to broadly obtain solutions of a given problem (problem of specifying display alarm signals at the time of plant abnormality in this embodiment).

In the alarm information processing system of this embodiment, the processing contents in its first and second information processing unit are different from each other in accordance with the presence/absence of a neural processing unit. It is therefore possible to obtain different solutions, that is, different display alarm signals to each other in the respective first and second information processing unit. It is therefore possible in this embodiment to minimize omission of solutions for a given problem.

In the case where the alarm signal 21A produced by the above-mentioned operation of a limit switch and so on is determined as the first produced alarm signal, the inference unit 26 executes the processing of the steps 26A through 26D on the basis of the alarm signal 21A. As an example in which the alarm signal 21A is produced in the first place, there is a case where a main steam stop valve is closed by 10% at the first in response to abnormality of a control unit for the main steam stop valve. From the above description, it can be also said that this embodiment has the above-mentioned first information processing unit and a third information processing unit which is disposed in parallel to the first information processing unit and which does not include a neural processing unit but include the knowledge processing unit 25. The first and third information processing units like this perform different processing and obtain different solutions for a given problem. It is therefore possible to broadly obtain solutions (display alarm signals) for a given problem.

In this embodiment, respective information processing unit disposed in parallel to each other so that each information unit complements information obtained by the other information processing unit.

The display alarm decision unit 28 is also means for selecting required one of solutions supplied from two knowledge processing units. The display alarm decision unit 28 in this embodiment performs the selection by ORing in order to minimize omission of display alarm signals from the view point of safety.

The first information processing unit in this embodiment can process uncertain information efficiently by use of the advantage of knowledge processing unit, thereby obtaining a suitable solution as destination. It is therefore possible to extremely reduce the number of alarm signals to be displayed for an abnormal event. Display of alarm signals in irreducible minimum of required number is preferred for a user in view of operating and monitoring a plant.

In this embodiment, information to be outputted is selected from places of information supplied from an information processing unit including a neural processing unit and another information processing unit disposed in parallel to the first-mentioned information processing unit and including a knowledge processing unit but including no neural processing unit. Therefore the selected information is high in its certainty.

The display alarm decision unit 28 determines alarm signals to be displayed on the basis of the respective outputs of the two information processing unit which are disposed in parallel to each other and which are different in information processing procedure. In this decision, the display alarm decision unit 28 obtains alarm signals to be displayed by complementing the respective information outputs of the two information processing unit with each other. In the information outputs of both the information processing unit, some pieces according with each other while some pieces do not accord with each other. Since the pieces of information which do not accord with each other can be also treated as alarm signals to be displayed by the ORing function of the display alarm decision unit 28, it is possible to increase the safety in view of monitoring the plant running. That is, information which could not be obtained by one information processing unit 25 can be complemented by the other information processing unit.

Also the display alarm decision unit 28 per se may be constituted by a knowledge processing unit. In this case, it is possible to determine alarm signals to be truly displayed on the basis of the outputs (alarm signals to be displayed) of the two information processing unit. For example, assume that alarm signals A, B and C are determined as alarm signals to be displayed by one information processing unit including the neural processing unit 3 and the knowledge processing unit 23, and assume that alarm signals D, E and F are determined as alarm signals to be displayed by the other information processing unit including the knowledge processing unit 25. Further assume that the alarm signal F has a causality with the alarm signal C and depends on the alarm signal C. Then, making the alarm signal C a display alarm signal, it is not necessary to make the alarm signal F a display alarm signal. Thus, making the display alarm decision unit 28 a knowledge processing unit, thereby complementing the information outputs of both the information processing unit with each other, it is possible to realize processing for obtaining new information.

In addition, in the processing in the step 1D of the inference unit 1, the first display alarm signal may be obtained by use of the third second knowledge without using the second knowledge. In this case, it is not necessary to store the second knowledge into the knowledge base 2. Knowledge having an identified abnormal event in its conclusion part is searched, and further knowledge having a condition part of the searched knowledge is searched. The latter search is repeated predetermined number of times till the search cannot be continued any more. First display alarm signals are obtained on the basis of input process signals corresponding to respective condition parts of all the knowledge obtained by the search. In this embodiment, the time taken for obtaining the first display alarm signals becomes longer than that in the above-mentioned embodiment. Except for this, the same effects as in the above-mentioned embodiment can be obtained.

Figure 13:
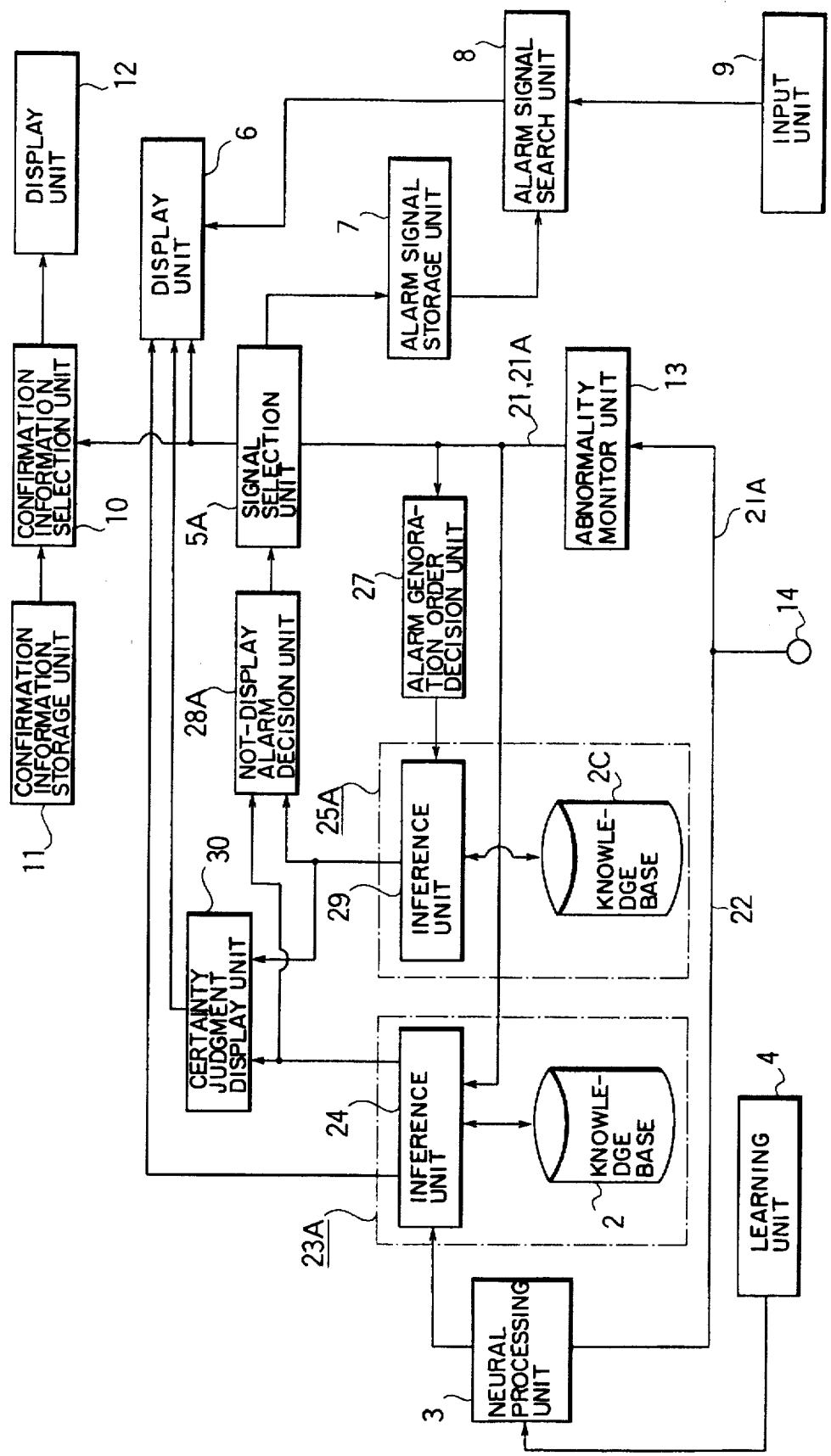
FIGS. 13, 16, 20, 22 and 24 are arrangement diagrams illustrating other embodiments of the present invention.

An alarm information processing unit of another embodiment of the present invention will be described with reference to FIG. 13. In this embodiment, the signal selection unit 5, the knowledge processing units 23 and 25, and the display alarm decision unit 28 of the constituents of the embodiment in FIG. 1 are replaced by a signal selection unit 5A, knowledge processing units 23A and 25A and a not-display alarm decision unit 28A, and a certainty judgment display unit 30 is provided newly. The knowledge processing units 23A and 25A are expert systems.

Figure 14:
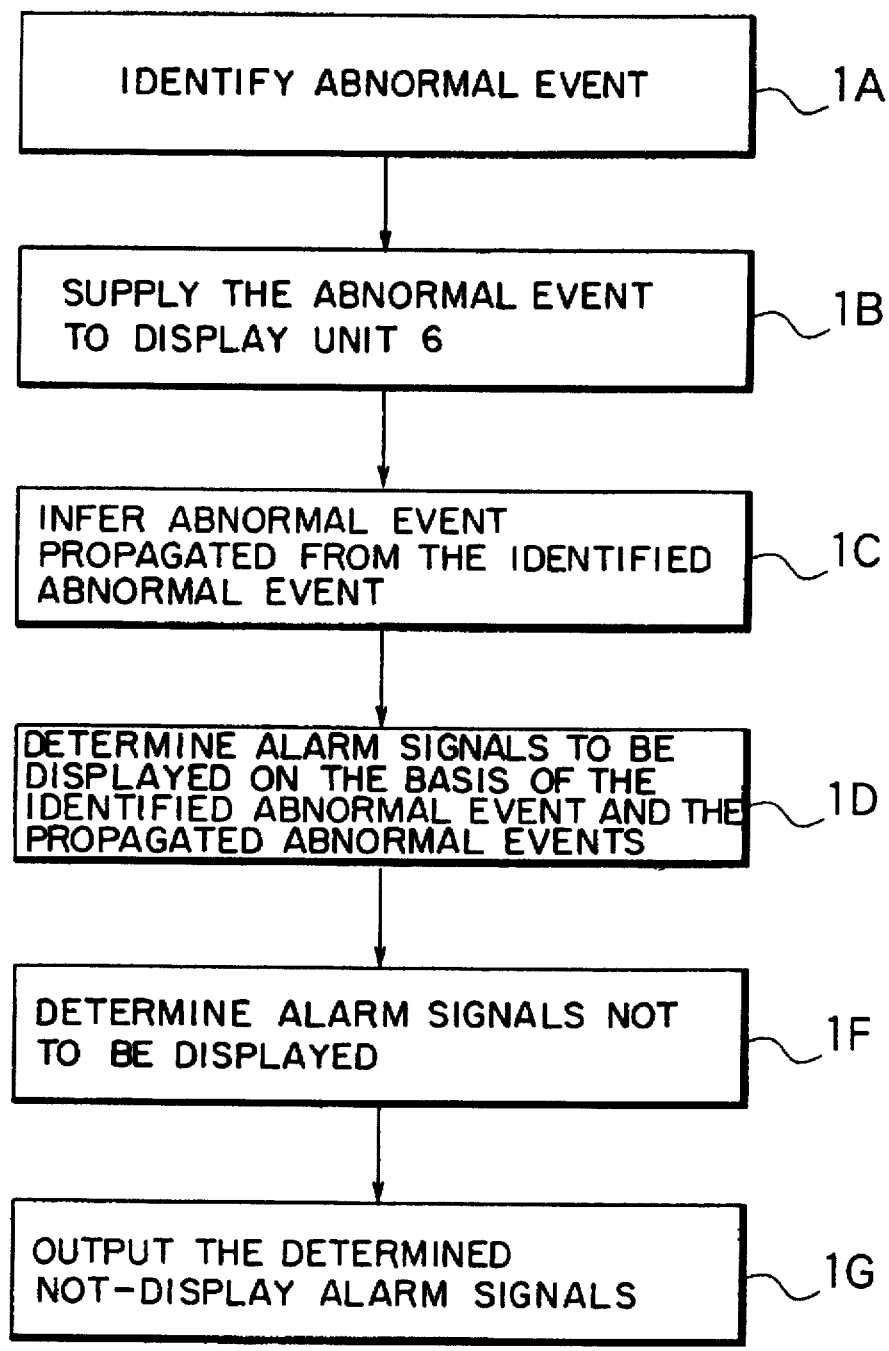
FIG. 14 is an explanatory diagram illustrating a processing procedure executed by the inference unit 24 of FIG. 13.

The knowledge processing unit 23A includes an inference unit 24 and a knowledge base 2. While an inference unit 1 is means for determining alarm signals to be displayed, the inference unit 24 is means for determining alarm signals not to be displayed (hereinafter referred to as 'not-display alarm signal'). The inference unit 24 executes a processing procedure shown in FIG. 14. This processing procedure is such that the steps 1F and 1G are added to the steps 1A through 1D of the processing procedure shown in FIG. 9. A knowledge base 2A stores not only first to fourth knowledges but also a fifth knowledge having names of abnormal events in its condition parts and all alarm signals produced in response to the abnormal events in its conclusion parts. In the processing of the step 1F executed after the step 1D, by use of an identified abnormal event and the fifth knowledge, extracted are all alarm signals produced in response to the identified abnormal events. Of all the alarm signals, the remainders except for first to third display alarm signals determined in the step D are determined to be not-display alarm signals. The not-display alarm signals determined in the step 1F are supplied to the not-display alarm decision unit 28A and the certainty judgment display unit 30 (the step 1G).

Figure 15:
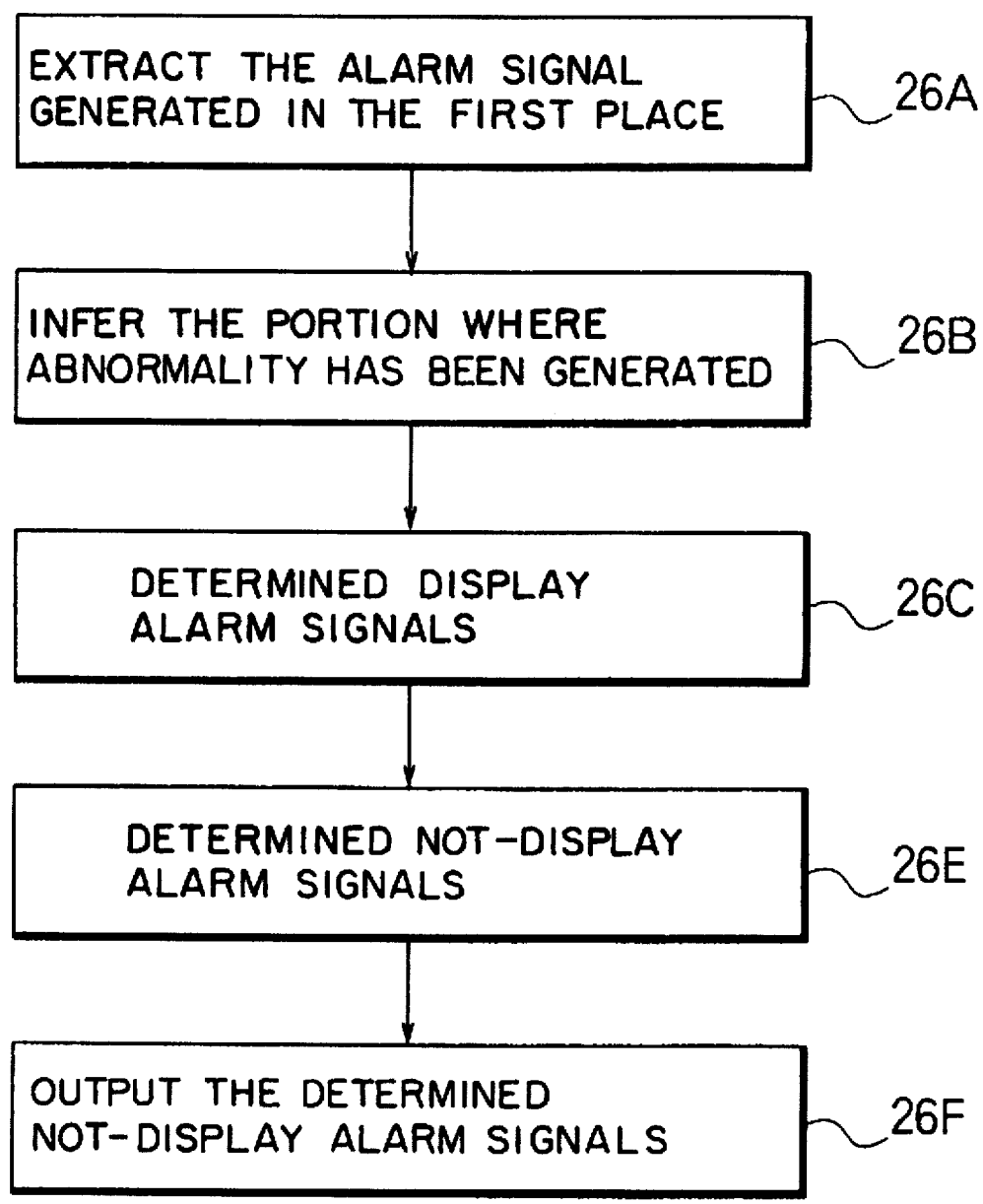
FIG. 15 is an explanatory diagram illustrating a processing procedure executed by an inference unit 29 of FIG. 13.

The knowledge processing unit 25A includes an inference unit 29 and a knowledge base 2C. The knowledge base 2C stores second, third, fifth and seventh knowledges. The seventh knowledge is a knowledge having the first alarm signal in its condition parts and all alarm signals relating to the first alarm signal in its conclusion parts. The inference unit 29 executes a processing procedure shown in FIG. 15. The processing in the step 26A through 26C is the same as in the embodiment of FIG. 1. In the step 26E, by use of the first alarm signal and the seventh knowledge, extracted are all alarm signals relating to the first alarm signal. Of all the alarm signals, eliminating the display alarm signals determined in the step 26C, the remainders are determined as not-display alarm signals. These not-display alarm signals are supplied to the not-display alarm decision unit 28A and the certainty judgment display unit 30 (the step 26F).

This embodiment determines not-display alarm signals from different points of view in the same manner as the embodiment of FIG. 1, so that it is possible to obtain more not-display alarm signals.

Of not-display alarm signals supplied from the knowledge processing units 23A and 25A, the not-display alarm decision unit 28A selects not-display alarm signals obtained by ANDing them and supplies those selected not-display alarm signals to the signal selection unit 5A. The reason why not-display alarm signals are selected through ANDing is that selection of agreed ones makes safety high in the case of not display alarm signals. Also in this embodiment, it is possible to select not-display alarm signals having high certainty. This embodiment has the same effects as the embodiment in FIG. 1.

The certainty judgment display unit 30 receives the output signals of the knowledge processing units 23A and 25A and judges certainty on the basis of those output signals. If the outputs of both the knowledge processing unit accord with each other, the certainty is 100%. If the outputs accord with each other by 80%, the certainty is 80%. The certainty judgment display unit 30 supplies the thus obtained certainty to a display unit 6. A user can see the displayed certainty to thereby easily judge the confirmation items and the range of the disposal operation.

Correspondingly to the above-mentioned not-display alarm signals, the signal selection unit 5A selects part of alarm signals 21 and 21A supplied thereto and causes an alarm signal storage unit 7 to store the selected part of the alarm signals 21 and 21A. The selected part alarm signals 21 and 21A is not supplied from the signal selection unit 5A to the display unit 6. The rest part alarm signals 21 and 21A which do not correspond to not-display alarm signals are supplied from the signal selection unit 5A to the display unit 6 so as to be displayed thereon.

Also according to this embodiment, it is possible to extremely reduce the number of alarm signals to be displayed for an abnormal event in the same manner as in the embodiment of FIG. 1. This embodiment has the same effects as those in the embodiment of FIG. 1.

Figure 16:
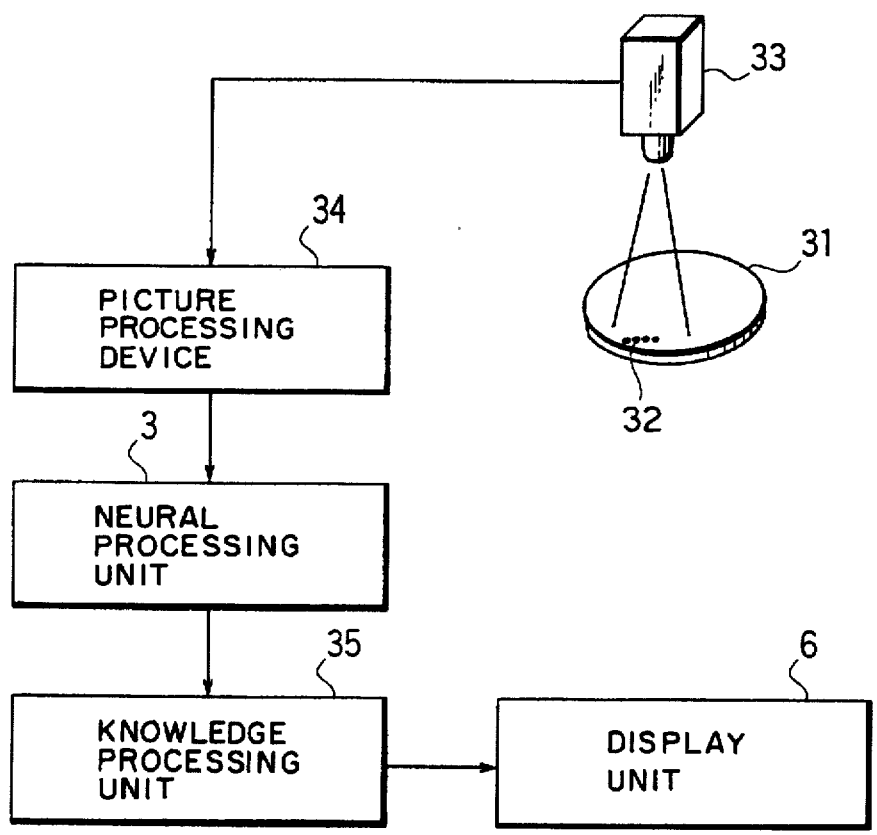

Referring to FIG. 16, a character recognition apparatus which is another embodiment of the present invention will be described. Prior to description of the embodiment, the outline of the manufacture of a semiconductor element to which the embodiment is applied will be described. First, a wafer which will be a mother body of the semiconductor element is produced. Various works of element formation on the wafer, pelletizing, mounting, bonding, and sealing to thereby complete a semiconductor element. A symbol is given to each wafer through exposure using a photomask in a mask step in an element forming step. The symbol is the number including a string of characters and designating the type of the semiconductor element to be produced. In order not to produce semiconductor elements different in type, in case producing step, the symbol of each wafer is confirmed so that predetermined working corresponding to the symbol is performed on the wafer. This embodiment is for recognition of the symbol given to each wafer.

Figure 17:
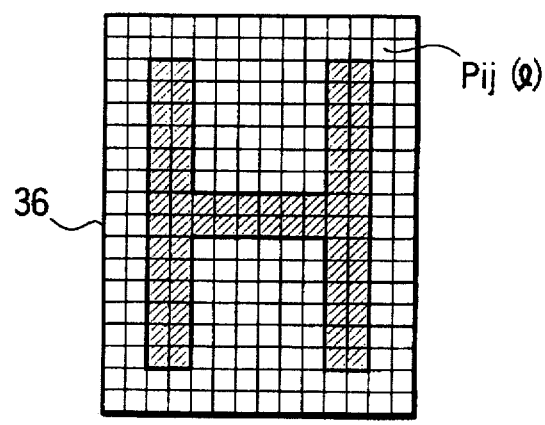
FIG. 17 is an explanatory diagram illustrating an example of a character pattern.

A symbol 32 given to a wafer 31 is such as shown in FIG. 17. Assume that a regular symbol is composed of six characters as a whole, in which two characters from left are alphabets and the other characters are numerals. The symbol 32 given to the wafer 31 is taken by a microscope camera 33 which sends a picture signal to a picture processing device 34. The picture processing device 34 first extracts a picture signal of the symbol 32 from the picture signal supplied from the microscope camera 33. Then, the picture processing device 34 performs the following processings. That is, the respective processings of removal of noises, emphasis of light and shape, and binary coding are performed on the extracted picture signal. A character pattern 36 is formed for each of the whole characters ($\underline{k}$ characters, k=6 in this embodiment) through the processings. As shown in FIG. 17, each character pattern is obtained as a two-dimensional character pattern $P_{ij}$ (l) (i=1–M, j=1–N, l=1–k) having picture elements composed of M rows and N columns. The picture processing device 34 supplies information of each of the M ×N picture elements for every character to neural processing unit 3. The neural processing unit 3 has learned the pattern of the respective characters. Outputs $Y_1$–$Y_2$ corresponding to the characters are outputted from respective units of an output layer of a neural network 3A on the basis of the supplied picture-element information. A knowledge processing unit 35 (an expert system) is provided with an inference unit and a knowledge base which are not shown in the drawing. The infer unit included in the knowledge processing unit 35 performs the processing of FIG. 18. This inference unit first takes in the output information $Y_1$–$Y_n$ of the neural processing unit 3 (the step 35A). Next, the inference unit converts the outputs $Y_1$–$Y_n$ for every input character into pieces of character information corresponding to the respective outputs $Y_1$–$Y_n$ on the basis of the first knowledge stored in the knowledge base as illustrated in the embodiment of FIG. 1 (the step 35B).

Figures 18, 19:
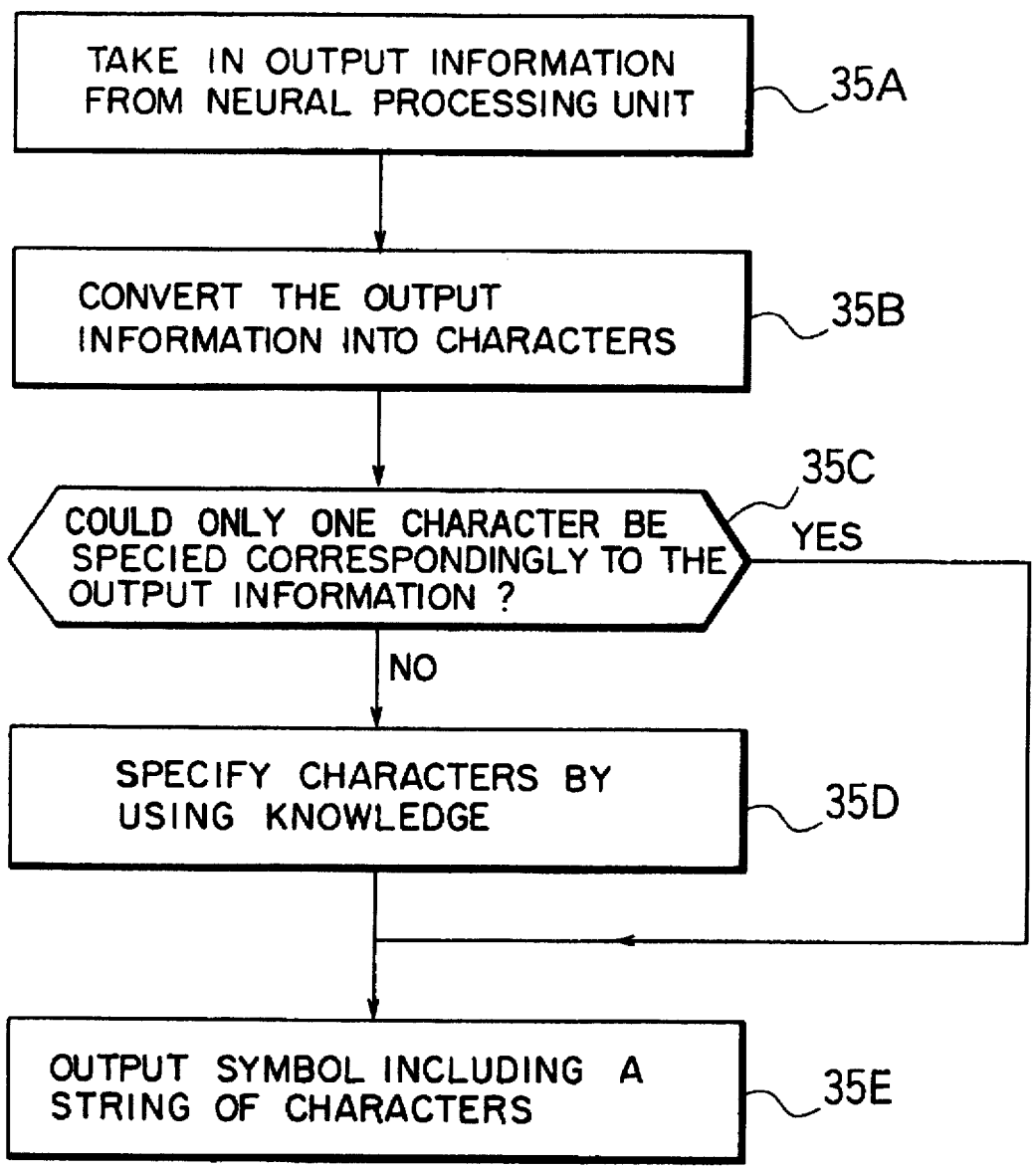
FIG. 18 is an explanatory diagram illustrating a processing procedure executed by the knowledge processing unit 35 of FIG. 16.
FIG. 19 is an explanatory diagram illustrating an example of a number taken by a microscope camera.

It is assumed that such a symbol as shown in FIG. 19 is given to a wafer because there is a defect in a portion of the symbol drawn on the photomask used in the mask step in the process of producing a semiconductor element. That is, the symbol is in a state in which it can not be distinguished whether the second character from left is B or 6. Thus, the picture-element information having two-dimensional character patterns obtained on the basis of the picture signals of the characters is supplied to the neural processing unit 3. It is assumed that the neural processing unit 3 produces $Y_1$=0.6, $Y_2$=0.5, $Y_3$=0.0 and $Y_4$=0.0 for the second character. However, the neural processing unit 3 produces $Y_1$=1.0, $Y_2$=0.0, $Y_3$=0.0, and $Y_4$=0.0 for "B" and $Y_1$=0.0, $Y_2$=1.0, $Y_3$=0.0, and $Y_4$=0.0 for "6". The inference unit which has received $Y_1$=0.6, $Y_2$=0.5, $Y_3$=0.0, and $Y_4$=0.0 judges that the second character is "B" or "6" on the basis of the first knowledge in the processing of the step 35B. Thereafter, it is judged whether the character corresponding to the outputs ($Y_1$–$Y_n$) of the neural processing unit 3 is specified or not (the step 35C). When the judgment of the step 35C is "YES", the operation is shifted to the step 35E. When the judgment is "NO", on the contrary, the step 35D is executed. In the case where it is judged that the second character is "B" or "6", the operation is shifted to the step 35D. That is, inference is performed by use of the knowledge showing the characteristic of the symbol 32 stored in the knowledge base, that is, the information that "the number of all the characters is six, the two left characters are alphabets, and the characters after the two left characters are numerals". As a result, it is judged that the second letter is "B". As a result, new information "HB7423"which is a symbol including a string of characters is supplied to display unit 6 (the step 35E).

In such an embodiment, in the case where the neural processing unit 3 does not produce the information which can specify each of the characters forming the symbol given onto one wafer, that is, in the case where plural pieces of character information (for example, two pieces of character information for "B" and "6" for the second character) are produced for one character, the plural pieces of character information can be specified into only one through complementing processing by the knowledge processing unit 35. In this embodiment, in the case where the neural processing unit produces two pieces of character information for one character, the knowledge processing unit 35 specifies (or select) the two pieces of character information into one. Accordingly, the certainty of each of pieces of the information showing the symbols produced from the knowledge processing unit 35 is extremely high. In other words, in this embodiment, the character information having high certainty can be produced.

In this embodiment, even if the information obtained by the neural processing unit 3 is uncertain (there are two pieces of character information for one character), insufficient information is complemented by the knowledge processing unit 35, so that accurate information can be finally obtained. In other words, whether the information obtained by the neural processing unit 3 is accurate or not is confirmed by the knowledge processing unit 35. In the case where the information is uncertain, the output of the neural processing unit is examined, so that erroneous information is removed so as to output correct information. For example, in the above example, in the case of $Y_1$=0.6, $Y_2$=0.5, $Y_3$=0.0, and $Y_4$=0.0, the existence of significant information can be detected in $Y_1$ and $Y_2$. In this case, it can be judged that no significant value exists in both the outputs of $Y_1$ and $Y_2$. Next, the case where the significant value exists in $Y_1$ is examined. In this case, the result of "B" is obtained. Further, the case where the significant value exists in $Y_2$ is examined. In this case, the result of "6" is obtained. Judging on the basis of the knowledge that the second letter is the alphabet, it is judged that "B" is correct while "6" is incorrect. Accordingly, the result that the second character is "B" can be outputted from the knowledge processing unit 3.

Thus, the output of the neural processing unit is confirmed by the knowledge processing unit, and the insufficient information is complemented so that accurate information can be efficiently obtained. In this embodiment, apparently, information is processed by the knowledge processing unit on the basis of the output of the neural processing unit, while the output information of the neural processing unit is mechanically complemented or confirmed by the knowledge processing unit.

Figure 20:
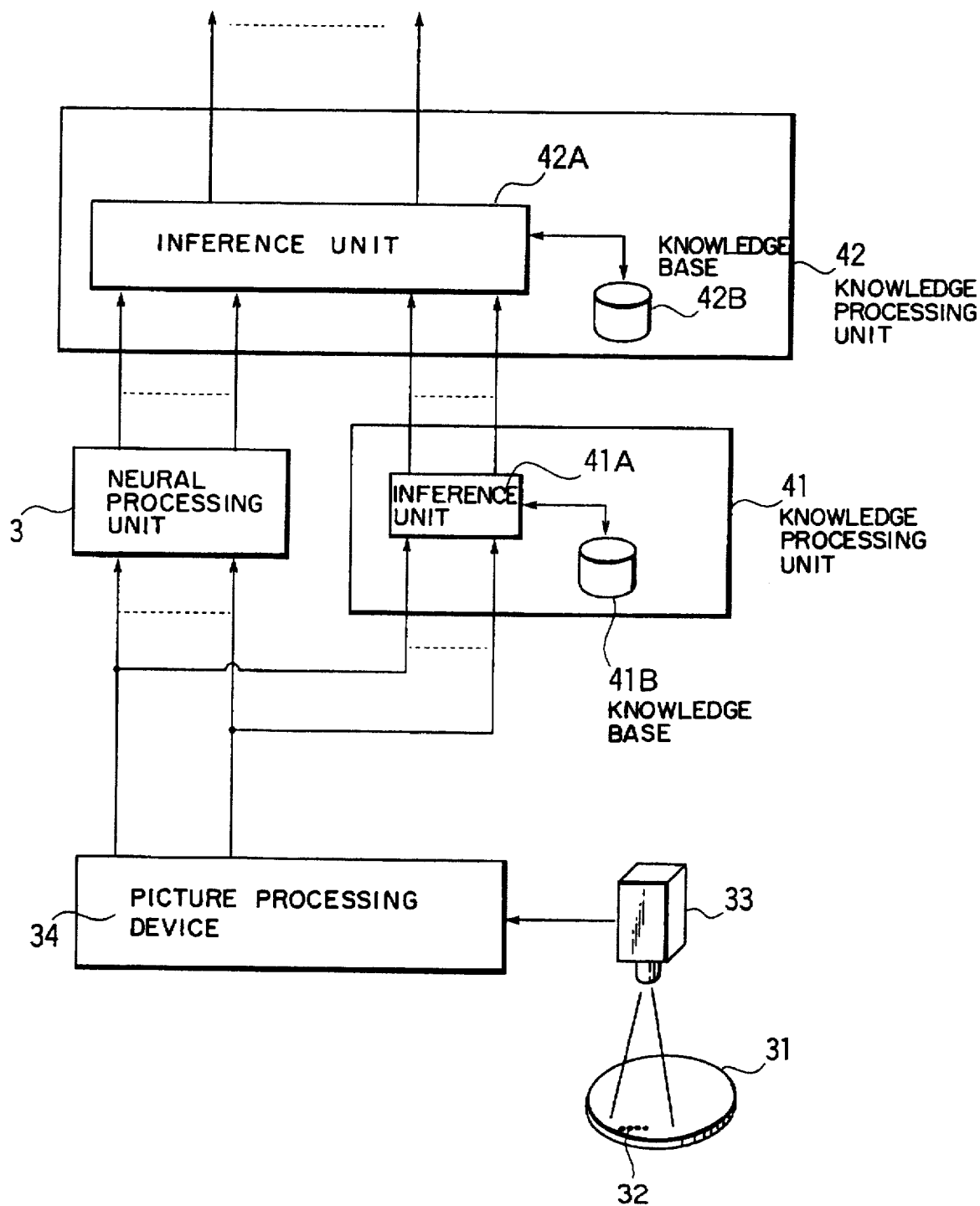
Figure 21:
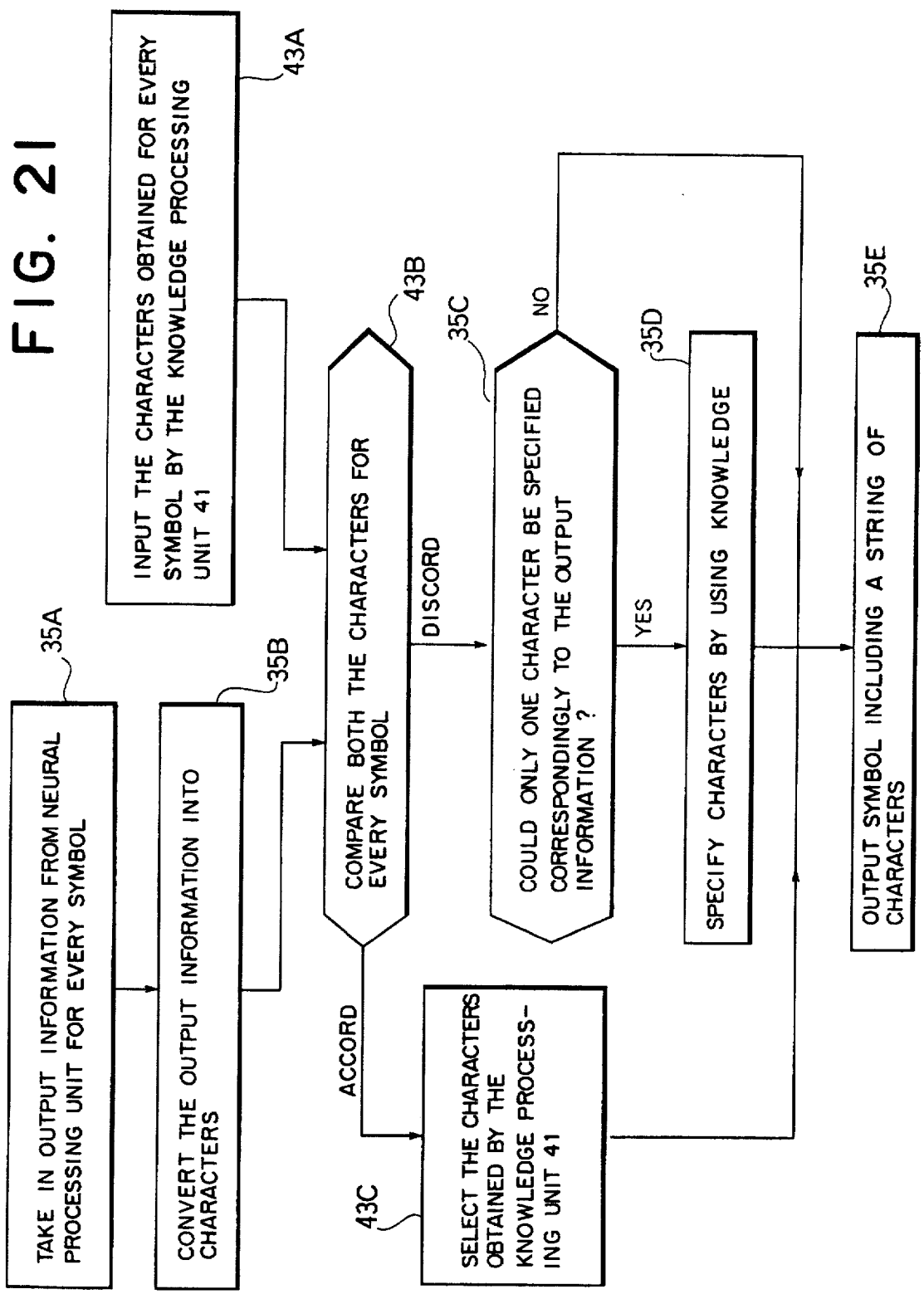
FIG. 21 is an explanatory diagram illustrating a processing procedure executed by the knowledge processing unit 42 of FIG. 20.

FIG. 20 shows a character recognition apparatus which is another embodiment of the present invention. This embodiment is different from the embodiment of FIG. 16 in the points that the outputs of a picture processing device 34 are supplied to a neural processing unit 3 and a knowledge processing unit 41 which are provided in parallel to each other, and that a knowledge processing unit 42 is provided. The information outputs of the neural processing unit 3 and the knowledge processing unit 41 are supplied to the knowledge processing unit 42. The knowledge processing units 41 and 42 which are expert systems respectively have inference units 41A and 42A and knowledge bases 41B and 42B respectively. The knowledge base 41B has picture information (a two-dimensional character pattern) of an output of the picture processing device 34 in a condition portion of the knowledge base 41B and stores knowledge (knowledge A) of the if-then type including the characters corresponding to the picture information in a conclusion portion of the knowledge base 41B. The inference unit 41 converts the supplied picture-element information into characters on the basis of the knowledge. The neural processing unit 3 performs processing similar to that of the embodiment of FIG. 16. The inference unit 42A executes the processing procedure of FIG. 21. First, in the steps 35A and 43A, output information of the neural processing unit 3 and a character of the knowledge processing unit 41 are supplied to the knowledge processing unit 42. After the step 35A is operated, a step 35B is executed. In the step 43B, the characters obtained in the steps 35B and 43A are compared with each other by a symbol unit, and it is judged whether the characters accord with each other or not. In the case where the characters accord with each other, the character obtained by the knowledge processing unit 42 is selected (a step 43C), and the selected character is supplied to a display unit 6 in the step 35E. The function of the step 43C is similar to that of the means corresponding to the display-alarm determining unit 28 of FIG. 1 which is arranged to select information to be outputted. In the case where the judgment in the step 43B is "discord", the processing (the steps 35C–35E) for the output information of the neural processing unit 3 is executed. The knowledge processing unit 42 in this embodiment has both the function of the selecting unit and the function of the knowledge processing unit 35 of FIG. 16.

In this embodiment, the neural processing unit 3 and the knowledge processing unit 41 are provided in parallel to each other, so that the input information can be processed from different points of view. Because the pieces of the output information due to the processing in the different points of views are produced through the processings in the steps 43B and 43C, the information obtained in this embodiment has high certainty. In this embodiment, since the processings in the steps 35C and 35D are executed, the effect obtained in the embodiment of FIG. 16 is also obtained.

Figure 22:
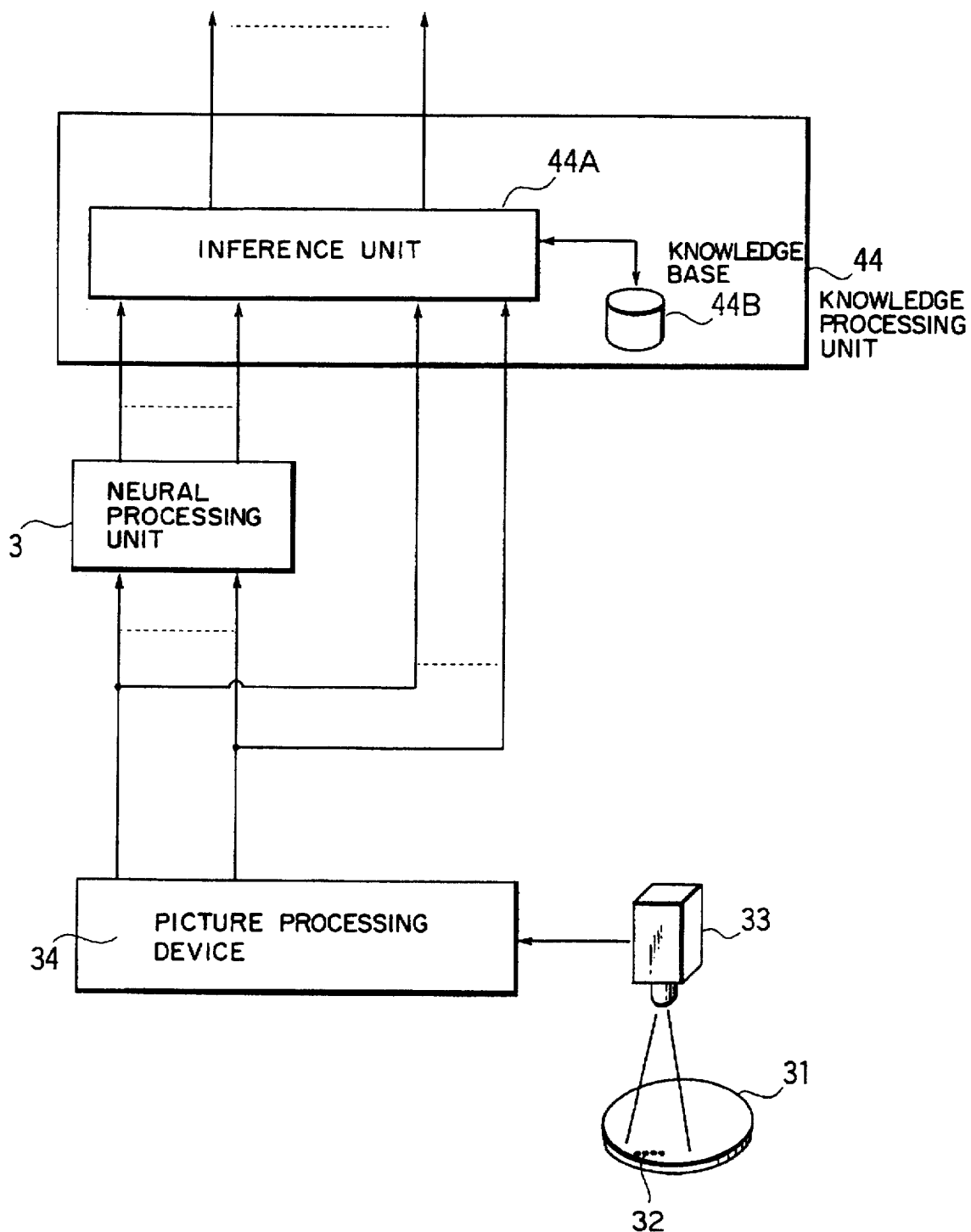

Referring to FIG. 22, a character recognition apparatus which is a further embodiment of the present invention will be described. In this embodiment, the output of a picture processing device 34 is supplied to a neural processing unit 3 and a knowledge processing unit (an expert system) 44 respectively. The output of the neural processing unit 3 is also supplied to the knowledge processing unit 44. The knowledge processing unit 44 is provided with an inference unit 44A and a knowledge base 44B.

Figure 23:
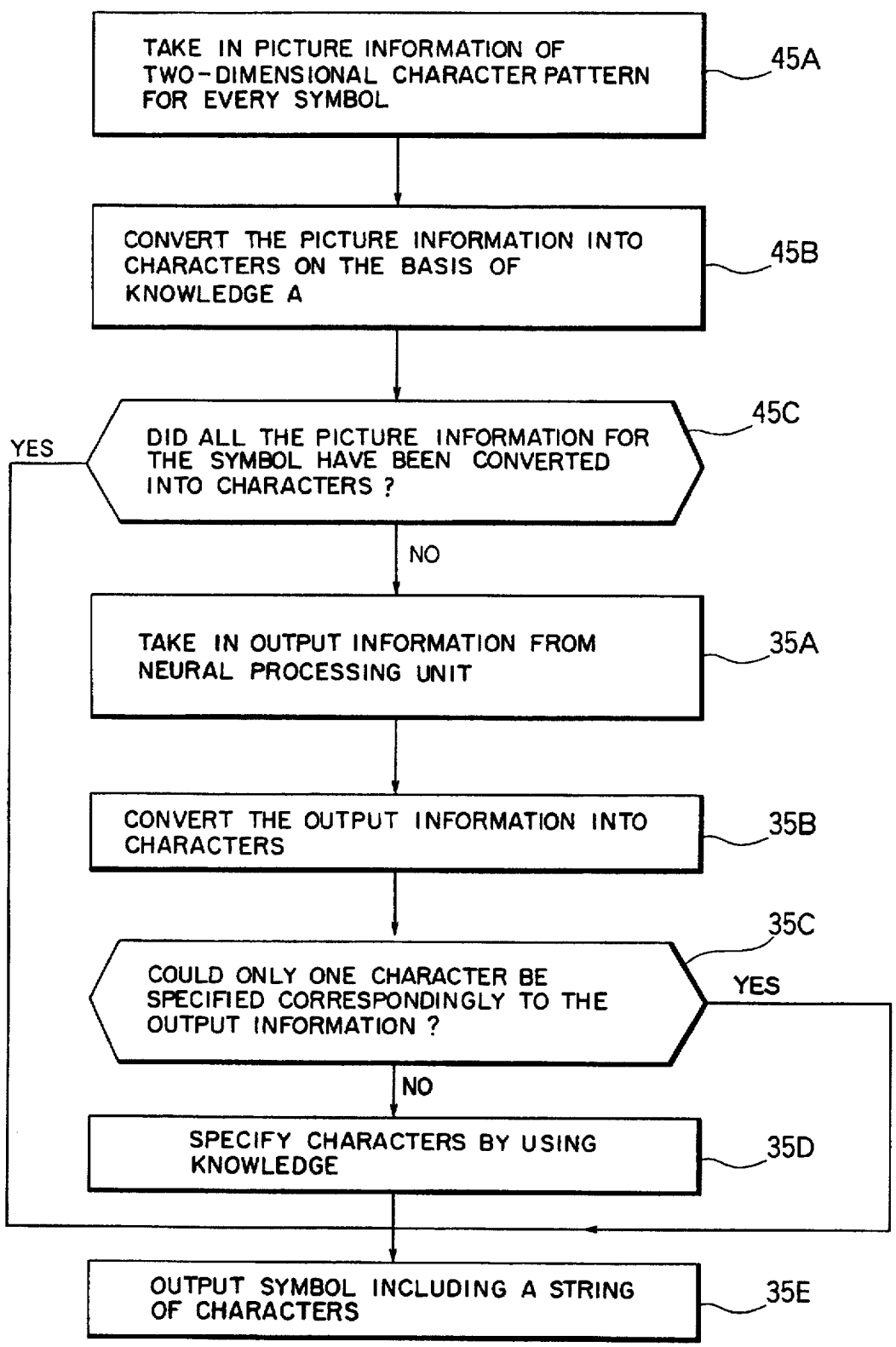
FIG. 23 is an explanatory diagram illustrating a processing procedure executed by the knowledge processing unit 44 of FIG. 22.

The inference unit 44A executes processing in FIG. 23. First, picture-element information produced from the picture processing device 34 is taken for every symbol (the step 45A). The picture-element information is converted into characters on the basis of the knowledge A (the step 45B). It is judged whether the whole of one symbol is converted into characters or not (the step 45C). In the case where the judgment is "NO", the steps 35A–35E are executed similarly to the embodiment of FIG. 16. In the case where the judgment is "YES" in the step 45C, on the contrary, the step 35E is executed.

In this embodiment, generally, a character is recognized by the knowledge processing unit 44 on the basis of the knowledge A, and when picture-element information in which a character can not be specified is supplied, one of pieces of information selected as candidates by the neural processing unit 3 is determined by the knowledge processing unit on the basis of other knowledge (the knowledge showing a feature of a symbol). The embodiment has the same effect as that of the embodiment of FIG. 16.

Figure 24:
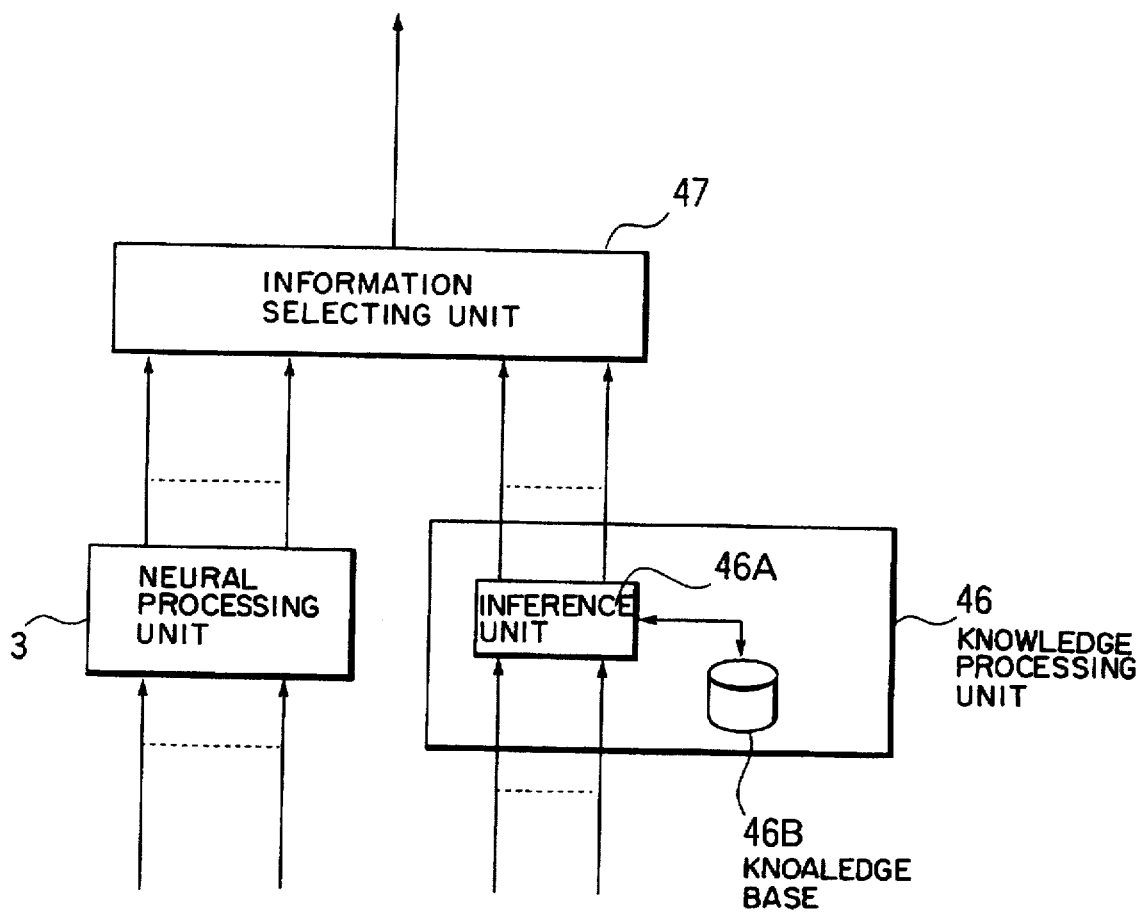

FIG. 24 shows an information processing system which is a further embodiment of the present invention. In this embodiment, a knowledge processing unit 46 and a neural processing unit 3 are provided in parallel to each other, and there is provided an information selecting unit 47 for selecting pieces of information produced from both the processing unit.

An inference unit 46A of the knowledge processing unit 46 produces a suitable solution (certainty 1) in the case where the input information accords with ruled knowledge. In the case where the input information is partially dropped, however, the certainty of the output solution is lowered. Accordingly, if input information far from the ruled knowledge is supplied, any solution is not outputted at all. At this time, it is expressed that the certainty is zero. Thus, the output information of the knowledge processing unit 46 is often outputted together with the certainty information showing reliability.

Figure 25:
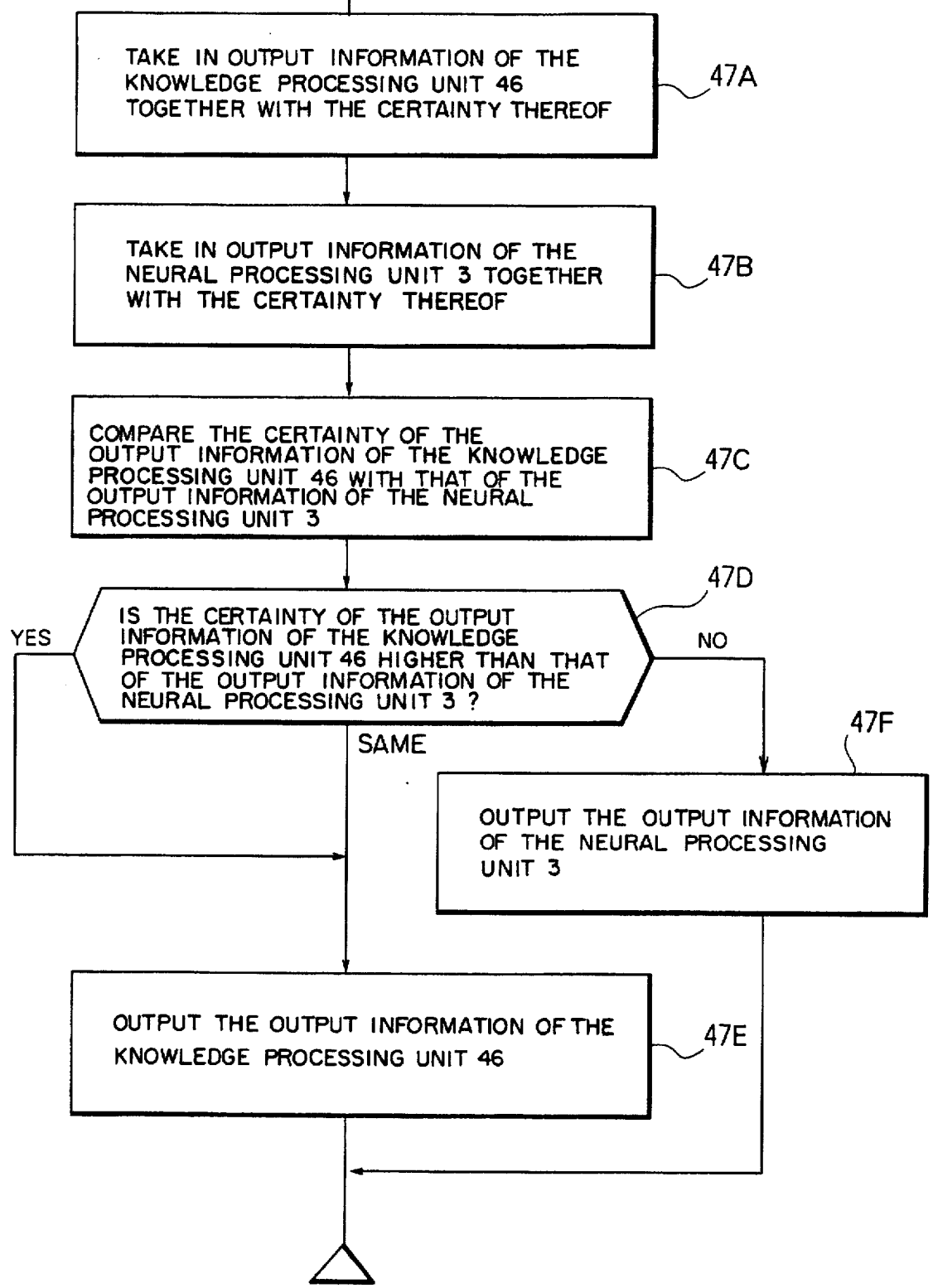
FIG. 25 is an explanatory diagram illustrating a processing procedure executed by the information selecting unit of FIG. 24.

On the other hand, the neural processing unit 3 outputs the information showing the degree of agreement of the input information with the result of learning as described above. Accordingly, the information per se shows the certainty. Then, the information having high certainty is selected by the information selecting unit 47, and the selected information is outputted as an output signal by the information selecting unit 47. FIG. 25 shows the processing procedure (the steps 47A–47E) executed for selecting information by the information selecting unit 47.

Figure 26:
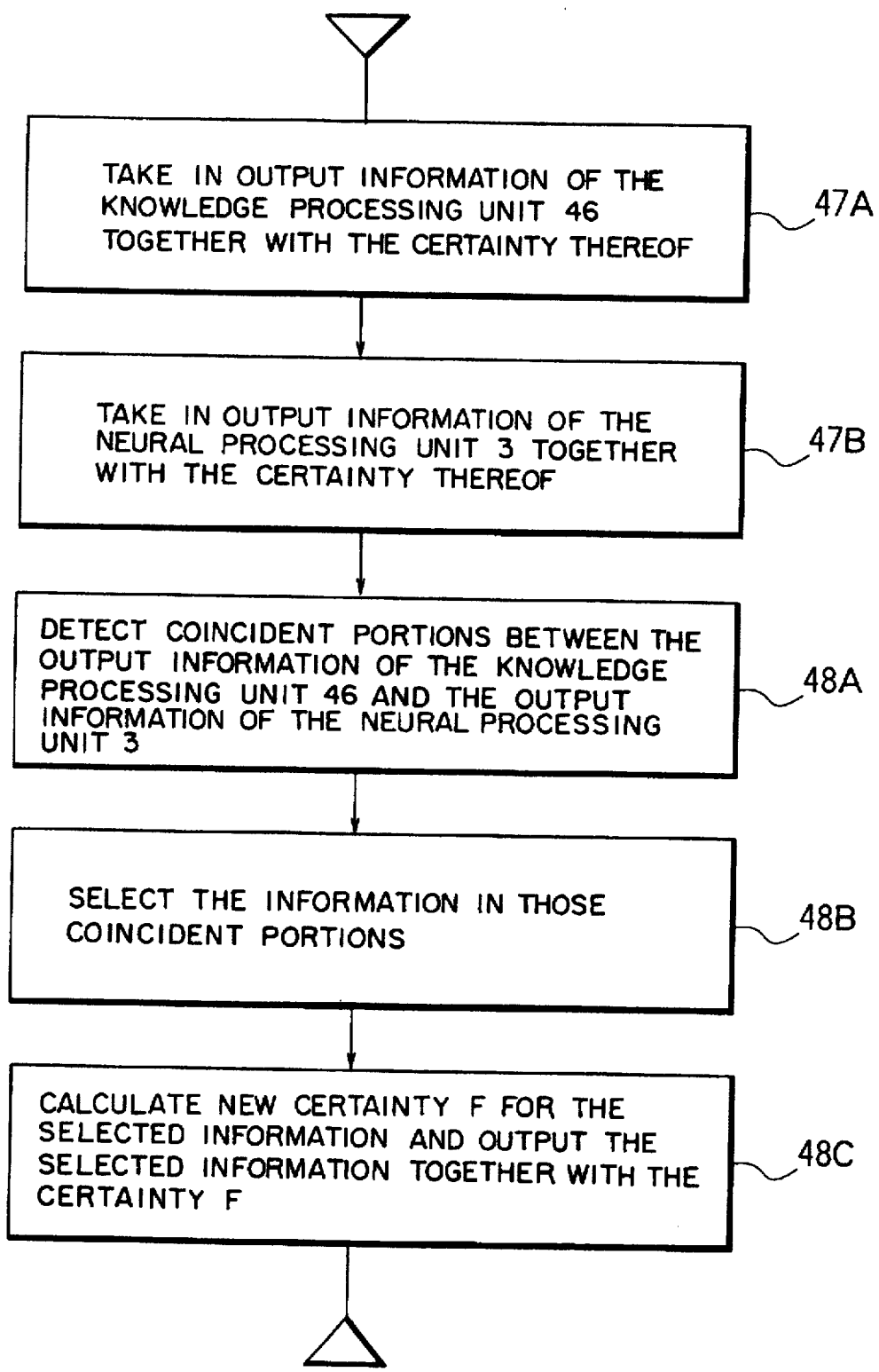
FIG. 26 is an explanatory diagram illustrating another embodiment of the processing procedure executed by the inference unit 29 of FIG. 13.

Further, an information processing system which is a further embodiment of the present invention will be described hereunder. In this embodiment, the processing procedure of FIG. 26 is executed by the information selecting unit 47 of FIG. 24 in place of the processing procedure of FIG. 25. In the processing procedure, the pieces of output information of the knowledge processing unit 46 and the neural processing unit 3 which agree with each other are produced together with newly calculated certainty F. The new certainty F is calculated in accordance with the following equation.

$$F = f_1 + f_2 - f_1 f_2 \qquad (4)$$

where $f_1$ expresses the certainty of the output information of the knowledge processing unit 46, and $f_2$ expresses the certainty of the output information of the neural processing unit 3.

Figure 27:
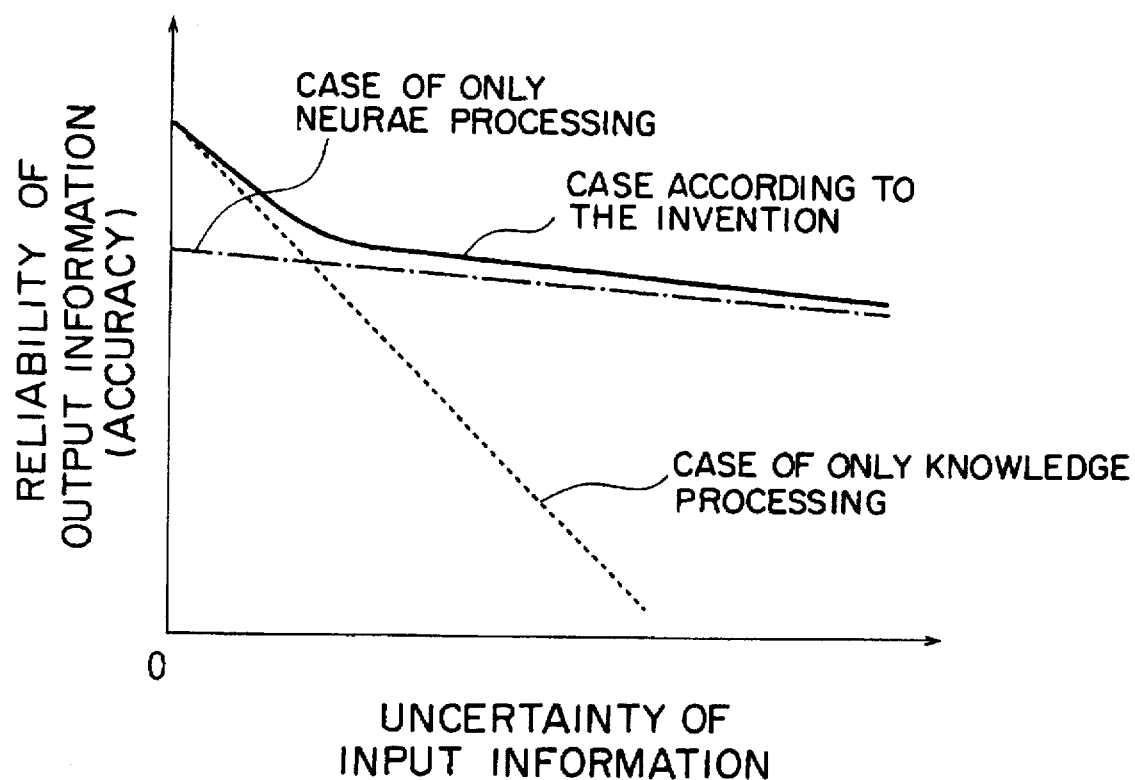
FIG. 27 is a characteristic diagram illustrating the degree of certainty of output information.

For example, when $f_1$ and $f_2$ are 0.8 and 0.7 respectively, F becomes 0.94 in accordance with the equation (4). This shows that the reliability of the output information is further improved by providing the knowledge processing unit and the neural processing unit in parallel to each other as shown in FIG. 27.

What is claimed is:

1. An information processing system comprising:

neural processing means for inputting a plurality of pieces of first information and outputting second information by processing said first information;

first knowledge processing means for outputting third information through inference by use of said second information from said neural processing means and first knowledge information;

first means for inputting said pieces of first information, and generating fourth information showing a singular state of each of said pieces of first information every time each of said pieces of first information is supplied thereto;

second knowledge processing means for outputting fifth information through inference by use of said fourth information from said first means and second knowledge information; and second means for receiving said third information and said fifth information and producing sixth information to be outputted by compensating one information of said third and fifth information with the other of said third and fifth information in a manner that said sixth information to be outputted at an arbitrary time point is produced by using both said third and fifth information together, simultaneously.

2. An information processing system comprising:

information processing means for inputting a plurality of pieces of first information and outputting second information by processing said pieces of first information;

first knowledge processing means for outputting third information through inference by use of said second information from said information processing means and knowledge information;

first means for inputting said pieces of first information and generating fourth information showing a singular state of each of said pieces of first information every time each of said pieces of first information is supplied thereto;

second knowledge processing means for outputting fifth information through inference by use of said fourth information from said first means and said knowledge information; and second means for receiving said third information and said fifth information and producing sixth information to be outputted by compensating one information of said third and fifth information with the other of said third and fifth information in a manner that said sixth information to be outputted at an arbitrary time point is produced by using both said third and fifth information together, simultaneously.

3. An information processing system comprising:

neural processing means for outputting a plurality of pieces of information as a result of neural processing of input information; and an expert system for executing inference using a rule so as to specify information corresponding to said rule from said pieces of information output by said neural processing means to thereby output said specified information in such a manner that said specified information to be outputted at an arbitrary time point is produced by using both said pieces of information and said rule together simultaneously.

4. An information processing system comprising:

neural processing means for outputting a plurality of pieces of information as a result of processing input information;

a first expert systems connected in said system to be parallel with said neural processing means, for outputting information through inference by use of said input information; and a second expert system for specifying information corresponding to a rule from said pieces of information output by said neural processing means to thereby output the specified information, when said pieces of information output by said neural processing means does not accord with said output information of said first expert system said, specified information to be outputted at an arbitrary time point is produced by using both said pieces of information from said neural processing means and said output information from said first expert system together, simultaneously.

5. An information processing system comprising:

neural processing means for inputting a plurality of pieces of process information and for outputting an abnormal event by processing said process information;

a first knowledge processing means for outputting first display alarm information through inference by use of said abnormal event outputted by said neural processing means and knowledge information;

abnormality monitor means for inputting said process information and outputting alarm information when said process information becomes abnormal;

second knowledge processing means for outputting second display alarm information through inference by use of said alarm information from said abnormality monitor means and said knowledge information;

display alarm output means for inputting said first and second display alarm information from said first and second knowledge processing means and outputting display alarm information by compensating one display alarm information of said first and second display alarm information with the other of said first and second display alarm information in such a manner that said display alarm information to be outputted at an arbitrary time point is produced by using both said first and second display alarm information together, simultaneously; and means for selecting alarm information corresponding to said display alarm information to be finally displayed as an output by said display alarm output means.

6. An information processing system according to claim 5, further comprising:

alarm information storage means for storing alarm information which is not selected by said means for selecting alarm information; and alarm information search means for searching for alarm information in said alarm information storage means in response to a search request signal and for supplying said alarm information resulting from a search to display means.

7. An information processing system according to claim 5, further comprising:

confirmation information storage means for storing confirmation information with respect to an abnormal event; and means for searching for confirmation information corresponding to an abnormal event supplied thereto in said conformation information storage means and for supplying said confirmation information resulting from said search to display means.

8. An information processing system comprising:

neural processing means for inputting a plurality of pieces of process information and for outputting an abnormal event by processing said process information;

first knowledge processing means for outputting first non-display alarm information through inference by use of said abnormal event output by said neural processing means and first knowledge information;

abnormality monitor means for inputting said pieces of process information and outputting alarm information when said process information becomes abnormal;

second knowledge processing means for outputting second non-display alarm information through inference by use of said alarm information from said abnormality monitor means and second knowledge information;

display alarm output means for inputting said first and second non-display alarm information from said first and second knowledge processing means and outputting display non-display alarm information indicating information not to be displayed by compensating one non-display alarm information of said first and second non-display alarm information with the other of said first and second non-display alarm information in such a manner that said non-display alarm information to be outputted at an arbitrary time point is produced by using both said first and second non-display alarm information together, simultaneously; and means for selecting alarm information which does not correspond to said non-display alarm information output by said display alarm output means.

9. An information processing system according to claim 8, further comprising:

alarm information storage means for storing alarm information which is not selected by said means for selecting alarm information; and alarm information search means for searching for alarm information in said alarm information storage means in response to a search request signal and for supplying said alarm information resulting from a search to display means.

10. An information processing system comprising:

first information processing means including a neural network for receiving a plurality of pieces of process information, outputting an abnormal event based on said plurality of pieces of process information and producing first display alarm information based on said abnormal event;

second information processing means including a knowledge processing means for processing one of said first display alarm information and said plurality of pieces of process information and producing second display alarm information, said second information processing means being an information processing means different from said first information processing means and including no neural network; and display alarm information outputting means for inputting said first display alarm information which is an output of said first information processing means and inputting said second display alarm information which is an output of said second information processing means, and for producing display alarm information to be outputted by complementing one display alarm information of said first display alarm information and said second display alarm information with the other display alarm information of said first display alarm information and said second display alarm information in a manner that said display alarm information to be outputted at an arbitrary time point is produced by using both said first and second display alarm information together simultaneously.

11. An information processing system comprising:

first information processing means including a neural network for inputting a plurality of pieces of process information, outputting an abnormal event based on said plurality of pieces of process information and producing first non-display alarm information based on said abnormal event;

second information processing means including knowledge processing means for processing one of said first non-display alarm information and said plurality of pieces of process information and producing second non-display alarm information, said second information processing means being an information processing means different from said first information processing means and including no neural network; and non-display alarm information outputting means for inputting said first non-display alarm information which is an output of said first information processing means and inputting said second non-display alarm information which is an output of said second information processing means, and for producing non-display alarm information to be outputted by complementing one display alarm information of said first non-display alarm information and said second non-display alarm information with the other display alarm information of said first non-display alarm information and said second non-display alarm information in a manner that said non-display alarm information to be outputted at an arbitrary time point is produced by using both said first and second non-display alarm information together, simultaneously.

12. An information processing system according to claim 11, further comprising:
a display device, and
means for selecting, from plural pieces of input alarm information, alarm information corresponding to display alarm information outputted from display alarm information outputting means, and for outputting the selected alarm information to said display device.

13. An information processing system according to claim 12, further comprising
an alarm information storage means for storing said alarm information which is not selected by said means for selecting alarm information, and
an alarm information search means for searching for alarm information from said alarm information storage means in response to a search request signal, and for outputting the searched alarm information to said display device.

14. An information processing system according to claim 11, further comprising:
a display device, and
means for selecting, from plural pieces of input information, alarm information which does not correspond to said non-display alarm information outputted from said non-display alarm information outputting means, and for outputting the selected alarm information to said display device.

15. An information processing system according to claim 14, further comprising:
an alarm information storage means for storing said alarm information which is not selected by said means for selecting alarm information, and
an alarm information search means for searching for alarm information from said alarm information storage means in response to a search request signal, and for outputting the searched alarm information to said display device.

16. An information processing system comprising:
a neural network for inputting a plurality of pieces of information and producing first information by processing said plurality of pieces of information;

an expert system for processing said plurality of pieces of information by inference using a rule and producing second information, said expert system being an information processing system different from said neural network; and means for inputting said first information said neural network and said second information output by said expert system, and for producing third information to be outputted by using both of said first information and said second information;

wherein said means for inputting and producing produces said third information to be outputted by compensating one information of said first information and said second information with the other information of said first information and said second information in a manner that said third information to be outputted at an arbitrary time point is produced by using both said first and second information together, simultaneously.

17. An information processing system according to claim 16, wherein
said means for receiving and producing produces said third information to be outputted by compensating said first information with said second information.

18. An information processing system comprising:
neural network for inputting a plurality of pieces of information and producing first information by processing said plurality of pieces of information;

an expert system for processing said plurality of pieces and information by inference using a knowledge information and producing second information, said expert system being an information processing means different from said neural network; and means for inputting said first information produced by said neural network and said second information produced by said expert system, for determining whether said first information produced by said neural network is accurate or not by using said knowledge information of said expert system, for producing said first information as an output of said information processing system when it is determined that said first information produced by said neural network is accurate, and for preparing new information by complementing said first information with said second information so that said first information becomes accurate and producing said new information as an output of said information processing system when it is determined that said first information obtained by said neural network is not accurate in a manner that said new information to be outputted at an arbitrary time point is produced by using both said first and second information together, simultaneously.

19. An information processing system comprising:
a neural network for inputting a plurality of pieces of information and producing first information by processing said plurality of pieces of information; and an expert system for processing said first information by inference using knowledge information such that said first information is compensated by said knowledge information and producing second information as said first information thus, compensated in a manner that said second information at an arbitrary time point is produced by using both said first information and said knowledge information together, simultaneously.

20. An information processing system comprising:

a neural network for inputting first plurality of pieces of information and producing first information by processing said first plurality of pieces of information; and an expert system for inputting second plurality of pieces of information and processing said second plurality of pieces of information by inference using knowledge information and said first information and producing second information in a manner that said second information at an arbitrary time point is produced by using both said first information and said knowledge information together simultaneously, said expert system being an information processing means different from said neural network.

21. An information processing system according to claim 20, wherein said neural network includes means for outputting an abnormal event based on said plurality of pieces of first information and for producing said abnormal event as said first information, and wherein said expert system includes means for inputting a plurality of pieces of alarm information as said second plurality of pieces of information, for processing said plurality of pieces of alarm information by said inference using said knowledge information and said abnormal event to select at least one piece of alarm information to be displayed from said plurality of pieces of alarm information, and for producing said selected at least one piece of alarm information as display alarm information which is said second information.

22. An information processing system comprising:

a neural network for inputting a plurality of pieces of information and producing first information by processing said plurality of pieces of information;

an expert system for processing said plurality of pieces of information by inference using knowledge information and producing second information, said expert system being an information processing means different from said neural network; and means for inputting said first information produced by said neural network and said second information produced by said expert system, and for producing third information to be outputted by compensating one information of said first information and said second information with the other information of said first information and said second information in a manner that said third information to be outputted at an arbitrary time point is produced by using both said first and second information together, simultaneously.

23. An information processing system according to claim 22, wherein said neural network includes means for inputting a plurality of pieces of alarm information as said plurality of pieces of information, and for outputting an abnormal event based on said plurality of pieces of alarm information and producing said abnormal event as said first information, and wherein said expert system includes means for inputting said plurality of pieces of alarm information as said plurality of pieces of information, for processing said plurality of pieces of alarm information by inference using said knowledge information to select at least one piece of alarm information to be displayed from said plurality of pieces of alarm information, and for producing said selected at least one piece of alarm information as first display alarm information which is said second information, and wherein said means for inputting includes means for selecting at least one first display alarm information based on said selected at least one piece of alarm information, and for producing said selected at least one first display alarm information as second display alarm information which is said third information to be outputted.

24. An information processing system according to claim 23, wherein said means for receiving includes said knowledge information and also includes means for, when said neural network can not obtain any abnormal event, selecting at least one first display alarm information by using said knowledge information.

25. An information processing system comprising:

information processing means having a neural network for inputting pregiven input information, and outputting output information in response to said pregiven input information and teacher information related to said output information, said neural network being arranged to correlate said pregiven input information, said output information and said teacher information so that said output information becomes equal to said teacher information, said information processing means outputs first information using said neural network in response to an inputted group of plural pieces of information; and an expert system for processing said first information by inference using knowledge information such that said first information is compensated by said knowledge information and producing second information as said first information thus compensated in a manner that said second information at an arbitrary time point is produced by using both said first information and said knowledge information together simultaneously, said expert system being an information processing means different from said information processing means.

26. An information processing system comprising:

an information processing means having a neural network for inputting pregiven input information, and outputting output information in response to said pregiven input information and teacher information related to said output information, said neural network being arranged to correlate said pregiven input information, said output information and said teacher information so that said output information becomes equal to said teacher information, said information processing means outputs first information using said neural network in response to an inputted first plural pieces of information; and an expert system for inputting a second plural pieces of information and processing said second plural pieces of information by inference using knowledge information and said first plural pieces of information and producing second information in a manner that said second information at an arbitrary time point is produced by using both said first plural pieces of information and said knowledge information together simultaneously, said expert system being an information processing means different from said information processing means.

27. An information processing system according to claim 26, wherein said neural network includes means for outputting an abnormal event based on said first plural pieces of information and for producing said abnormal event as said first information, and wherein said expert system includes means for inputting a plurality of pieces of alarm information as said second plural pieces of information, for processing said plurality of pieces of alarm information by inference using said knowledge information and said abnormal event to select at least one piece of alarm information to be displayed from said plurality of pieces of alarm information, and for producing said selected at least one piece of alarm information as display alarm information which is said second information.

28. An information processing system comprising:

information processing means having a neural network for inputting pregiven input information, and outputting output information in response to said pregiven input information and teacher information related to said output information, said neural network being arranged to correlate said pregiven input information, said output information and said teacher information so that said output information becomes equal to said teacher information, said information processing means outputs first information using said neural network in response to an inputted first plural pieces of information; and an expert system for inputting second plural pieces of information, processing said second plural pieces of information by inference using knowledge information and producing second information, said expert system being an information processing means different from said information processing means having said neural network; and means for inputting said first information output by said information processing means and said second information output by said expert system, and for producing third information to be outputted by compensating one information of said first information and said second information with the other information of said first information and said second information in a manner that said third information to be outputted at an arbitrary time point is produced by using both said first and second information together, simultaneously.

29. An information processing system according to claim 28, wherein said neural network includes means for inputting a plurality of pieces of alarm information as said first plural pieces of information, and for outputting an abnormal event based on said plurality of pieces of alarm information and producing said abnormal event as said first information, and wherein said expert system includes means for inputting said plurality of pieces of alarm information as said second plural pieces of information, for processing said plurality of pieces of alarm information by inference using said knowledge information to select at least one piece of alarm information to be displayed from said plurality of pieces of alarm information, and for producing said selected at least one piece of alarm information as first display alarm information which is said second information, and wherein said means for inputting includes means for selecting at least one first display alarm information based on said selected at least one piece of alarm information, and for producing said selected at least one first display alarm information as second display alarm information which is said third information to be outputted.

30. An information processing system according to claim 29, wherein said means for receiving includes said knowledge information and also includes means for, when said neural network can not output any abnormal event, selecting at least one first display alarm information by using said knowledge information.

31. An information processing system comprising:

first information processing means including a neural network for inputting a plurality of pieces of information and producing first information by processing said plurality of pieces of information; and second information processing means including an expert system for processing said first information by inference using knowledge information such that said first information is compensated by said knowledge information and producing second information as said first information thus compensated in a manner that said second information at an arbitrary time point is produced by using both said first information and said knowledge information together simultaneously, said second information processing means being an information processing means different from said first information processing means.

32. An information processing system comprising:

first information processing means including a neural network for inputting first plurality of pieces of information and producing first information by processing said first plurality of pieces of information; and second information processing means including an expert system for inputting second plurality of pieces of information and processing said second plurality of pieces of information by inference using knowledge information and said first information and producing second information in a manner that said second information at an arbitrary time point is produced by using both said first pieces of information and said knowledge information together simultaneously, said second information processing means being an information processing means different from said first information processing means.

33. An information processing system according to claim 32, wherein said neural network includes means for outputting an abnormal event based on said first plurality of pieces of information and for producing said abnormal event as said first information, and wherein said expert system includes means for inputting a plurality of pieces of alarm information as said second plurality of pieces of information, for processing said plurality of pieces of alarm information by inference using said knowledge information and said abnormal event to select at least one piece of alarm information to be displayed from said plurality of pieces of alarm information, and for producing said selected at least one piece of alarm information as display alarm information which is said second information.

34. An information processing system comprising:

first information processing means including a neural network for inputting a plurality of pieces of information and producing first information by processing said plurality of pieces of information;

second information processing means including an expert system for processing said plurality of pieces of information by inference using knowledge information and producing second information, said second information processing means being an information processing means different from said first information processing means; and means for inputting said first information which is an output of said first information processing means, and inputting said second information which is an output of said second information processing means, and for producing third information to be outputted by compensating one information of said first information and said second information with the other information of said first information and said second information in a manner that said third information to be outputted at an arbitrary time point is produced by using both said first and second information together, simultaneously.

35. An information processing system according to claim 34, wherein said neural network includes means for inputting a plurality of pieces of alarm information as said plurality of pieces of information, for detecting an abnormal event based on said plurality of pieces of alarm information and producing said abnormal event as said first information, and wherein said expert system includes means for inputting said plurality of pieces of alarm information as said plurality of pieces of information, for processing said plurality of pieces of alarm information by inference using said knowledge information to select at least one piece of alarm information to be displayed from said plurality of pieces of alarm information, and for producing said selected at least one piece of alarm information as first display alarm information which is said second information, and wherein said means for inputting includes means for selecting at least one first display alarm information based on said selected at least one piece of alarm information, and for producing said selected at least one first display alarm information as second display alarm information which is said third information to be outputted.

36. An information processing system according to claim 35, wherein said means for receiving includes said knowledge information and also includes means for, when said neural network can not output any abnormal event, selecting at least one first display alarm information by using said knowledge information.

37. An information processing system comprising:

a neural network for inputting a plurality of pieces of information and producing first information by processing said plurality of pieces of information; and an expert system for processing said first information by inference using knowledge information such that said first information is compensated by said knowledge information and producing second information as said first information thus compensated in a manner that said second information at an arbitrary time point is produced by using both said first information and said knowledge information together simultaneously, said expert system being an information processing means different from said neural network.

38. An information processing system comprising:

a neural network for inputting first plurality of pieces of information and producing first information by processing said first plurality of pieces of information; and an expert system for inputting second plurality of pieces of information and processing said second plurality of pieces of information by inference using knowledge information and said first information output by said neural network such that said first information is compensated by said knowledge information and producing second information in a manner that said second information at an arbitrary time point is produced by using both said first information and said knowledge information together simultaneously, said expert system being an information processing means different from said neural network.

39. An information processing system according to claim 38, wherein said neural network includes means for detecting an abnormal event based on said first plurality of pieces of information and for producing said abnormal event as said first information, and wherein said expert system includes means for inputting a plurality of pieces of alarm information as said second plurality of pieces of information, for processing said plurality of pieces of alarm information by inference using said knowledge information and said abnormal event to select at least one piece of alarm information to be displayed from said plurality of pieces of alarm information, and for producing said selected at least one piece of alarm information as display alarm information which is said second information.

40. An information processing system comprising:

a neural network for inputting a plurality of pieces of information and producing first information by processing said first plurality of pieces of information;

an expert system for processing said plurality of pieces of information by inference using knowledge information and producing second information, said expert system being an information processing means different from said neural network; and means for inputting said first information produced by said neural network and said second information produced by said expert system, and for producing third information to be outputted by using both of said first information and said second information in a manner that said third information to be outputted at an arbitrary time point is produced by using both said first and second information together, simultaneously.

41. An information processing system according to claim 40, wherein said neural network includes means for inputting a plurality of pieces of alarm information as said plurality of pieces of information, for detecting an abnormal event based on said plurality of pieces of alarm information and producing said abnormal event as said first information, wherein said expert system includes means for inputting said plurality of pieces of alarm information as said plurality of pieces of information, for processing said plurality of pieces of alarm information by said inference using said knowledge information to select at least one piece of alarm information to be displayed from said plurality of pieces of alarm information, and for producing said selected at least one piece of alarm information as first display alarm information which is said second information, and wherein said means for inputting includes means for selecting at least one first display alarm information based on said selected at least one piece of alarm information, and for producing said selected at least one first display alarm information as second display alarm information which is said information to be outputted.

42. An information processing system according to claim 41, wherein said means for receiving includes said knowledge information and also includes means for, when said neural network can not output any abnormal event, selecting at least one first display alarm information by using said knowledge information.

43. An information processing system comprising:

a neural network for inputting first plural pieces of information and producing first information by processing said first plural pieces of information;

an expert system for inputting said first information produced by said neural network, for determining whether said first information produced by said neural network has insufficient information or not by inference using said first information and knowledge information of said expert system, for outputting information based on said first information as an output of said information processing system when it is determined that said first information output by said neural network has sufficient information, and for preparing new information by compensating said first information with said knowledge information of said expert system in a manner that said new information at an arbitrary time point is prepared by using both said first information and said knowledge information of said expert system together so that said first information becomes accurate and for outputting said new information as an output of said information processing system when it is determined that said first information obtained by said neural network has insufficient information.

44. An information processing system comprising:

a neural network for inputting first plural pieces of information and producing first information by processing said first plural pieces of information;

an expert system for inputting said first information produced by said neural network and second plural information, for determining whether said first information produced by said neural network has insufficient information or not by inference using said first information and said second plural information and knowledge information of said expert system, for outputting information based on said first information as an output of said information processing system when it is determined that said first information output by said neural network has sufficient information, and for preparing a new information by compensating said first information with said knowledge information of said expert system in a manner that said new information at an arbitrary time point is prepared by using both said first information and said knowledge information of said expert system together, simultaneously so that said first information becomes accurate and for outputting said new information as an output of said information processing system when it is determined that said first information obtained by said neural network has insufficient information.

45. An information processing system comprising:

a neural network for inputting first plural pieces of information and producing first information by processing said first plural pieces of information;

a first expert system for inputting second plural pieces of information and processing second plural pieces of information by inference using knowledge information and producing second information, said first expert system being an information processing system different from said neural network; and a second expert system for inputting said first information produced by said neural network and said second information produced by said first expert system, for determining whether said first information produced by said neural network has insufficient information or not by inference using said first and second information and knowledge information of said second expert system, for outputting information based on said first information as an output of said information processing system when it is determined that said first information produced by said neural network has sufficient information, and for preparing new information by compensating said first information with said knowledge information of said second expert system in a manner that said new information at an arbitrary time point is prepared by using both said first information and said knowledge information of said second expert system together, so that said first information becomes accurate and for outputting said new information as an output of said information processing system when it is determined that said first information output by said neural network has insufficient information.

46. An information processing system comprising:

a neural network for inputting first plural pieces of information and producing first information by processing said first plural pieces of information;

a first expert system for inputting second plural pieces of input information, processing said second plural pieces of information by inference using knowledge information and producing second information, said first expert system being an information processing means different from said neural network; and a second expert system for receiving said first information produced by said neural network and said second information produced by said first expert system, for determining whether said first information produced by said neural network has insufficient information or not by inference using said first and second information and knowledge information of said second expert system and for outputting a result of the determination.

47. An information processing system comprising:

a neural network for inputting a plurality of pieces of information and producing first information by processing said plurality of pieces of information;

an expert system for processing one of said first information and said plurality of pieces of information by inference using knowledge information and producing second information, said expert system being an information processing system different from said neural network; and means for inputting said first information produced by said neural network and said second information produced by said expert system, and for producing third information to be outputted by compensating one information of said first information and said second information with the other information of said first information and said second information in a manner that said third information to be outputted at an arbitrary time point is produced by using both said first and second information together, simultaneously.

* * * * *